(12) United States Patent
Ochimizu et al.

(10) Patent No.: US 9,989,631 B2
(45) Date of Patent: Jun. 5, 2018

(54) LASER RADAR DEVICE AND RADAR IMAGE GENERATING METHOD

(71) Applicants: Mitsubishi Electric Corporation, Tokyo (JP); Mitsubishi Electric TOKKI Systems Corporation, Tokyo (JP)

(72) Inventors: Hideaki Ochimizu, Tokyo (JP); Yuichi Nishino, Tokyo (JP); Hidenobu Tsuji, Tokyo (JP); Nobuki Kotake, Tokyo (JP); Masaharu Imaki, Tokyo (JP); Shumpei Kameyama, Tokyo (JP); Takashi Saito, Tokyo (JP)

(73) Assignees: Mitsubishi Electric Corporation, Tokyo (JP); Mitsubishi Electric TOKKI Systems Corporation, Tokyo (JP)

( * ) Notice: Subject to any disclaimer, the term of this patent is extended or adjusted under 35 U.S.C. 154(b) by 398 days.

(21) Appl. No.: 14/892,714

(22) PCT Filed: May 28, 2014

(86) PCT No.: PCT/JP2014/064108
§ 371 (c)(1),
(2) Date: Nov. 20, 2015

(87) PCT Pub. No.: WO2014/192805
PCT Pub. Date: Dec. 4, 2014

(65) Prior Publication Data
US 2016/0103210 A1   Apr. 14, 2016

(30) Foreign Application Priority Data
May 29, 2013 (JP) ................. 2013-113232

(51) Int. Cl.
*G01C 3/08* (2006.01)
*G01S 7/497* (2006.01)
(Continued)

(52) U.S. Cl.
CPC ............ *G01S 7/497* (2013.01); *G01S 7/4865* (2013.01); *G01S 17/42* (2013.01); *G01S 17/89* (2013.01)

(58) Field of Classification Search
CPC ........ G01S 7/497; G01S 7/4865; G01S 17/42; G01S 17/89
(Continued)

(56) References Cited

U.S. PATENT DOCUMENTS 4,198,702 A * 4/1980 Clifford .................. G01S 7/529
367/106
6,856,380 B2 * 2/2005 Wong ...................... G01S 17/89
348/147

(Continued)

FOREIGN PATENT DOCUMENTS

JP          62-24747      5/1987
JP          03-006408 A   1/1991
(Continued)

OTHER PUBLICATIONS

The extended European search report issued by the European Patent Office dated Nov. 28, 2016, which corresponds to European Patent Application No. 14804943.0-1812 and is related to U.S. Appl. No. 14/892,714.

(Continued)

*Primary Examiner* — Mark Hellner
(74) *Attorney, Agent, or Firm* — Studebaker & Brackett PC

(57) ABSTRACT

A system controller 16 determines whether the quality of either a distance image or a light intensity image satisfies
(Continued)

reference quality, and, when the quality of either the distance image or the light intensity image dos not satisfy the reference quality, outputs a speed change command to lower a speed, an altitude change command to change a submarine altitude (depth), or the like to a navigation control unit 2, thereby changing a physical relative relation between a measurement plane 3 and a device in question. As an alternative, the system controller changes a beam scanning rate f, a beam divergence θ, or the like within limits at which the amount of variation in a spatial resolution does not exceed a permissible amount.

15 Claims, 21 Drawing Sheets

(51) Int. Cl.
  *G01S 17/89* (2006.01)
  *G01S 7/486* (2006.01)
  *G01S 17/42* (2006.01)
(58) Field of Classification Search
  USPC ........................................................ 356/5.01
  See application file for complete search history.

(56) References Cited

U.S. PATENT DOCUMENTS

| | | | |
|---|---|---|---|
| 2001/0015755 A1* | 8/2001 | Mathews | G01C 11/02 348/144 |
| 2015/0254901 A1* | 9/2015 | Pollock | G01C 11/02 345/420 |

FOREIGN PATENT DOCUMENTS

| | | |
|---|---|---|
| JP | 10-221447 A | 8/1998 |
| JP | 10-332825 A | 12/1998 |
| JP | 3001866 B1 | 1/2000 |
| JP | 2003-156330 A | 5/2003 |
| JP | 2007-218806 A | 8/2007 |
| JP | 2010-133802 A | 6/2010 |
| JP | 2012-154863 A | 8/2012 |
| JP | 2012-215390 A | 11/2012 |

OTHER PUBLICATIONS

International Search Report, PCT/JP2014/064108, dated Sep. 9, 2014.

* cited by examiner

FIG.5
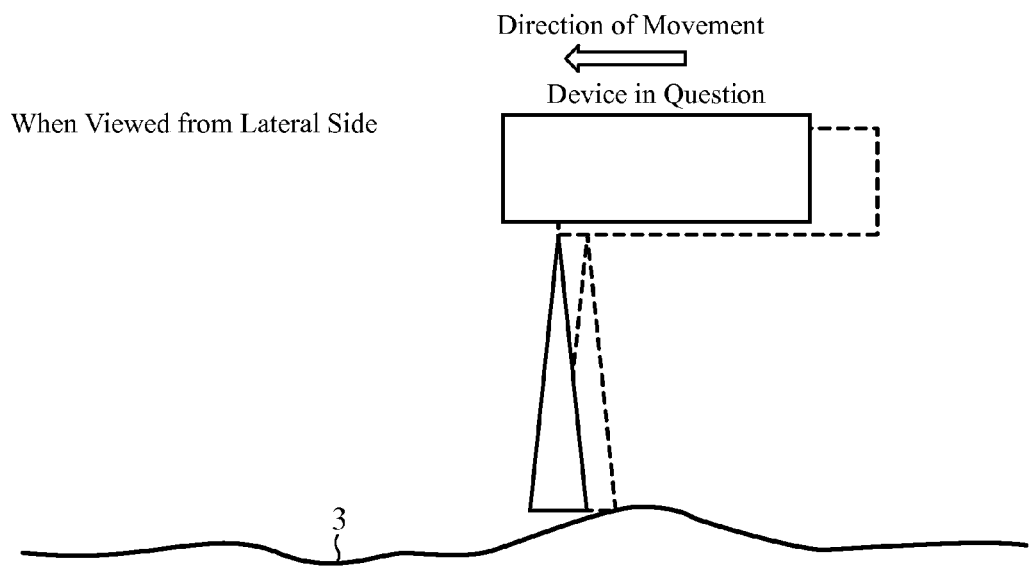
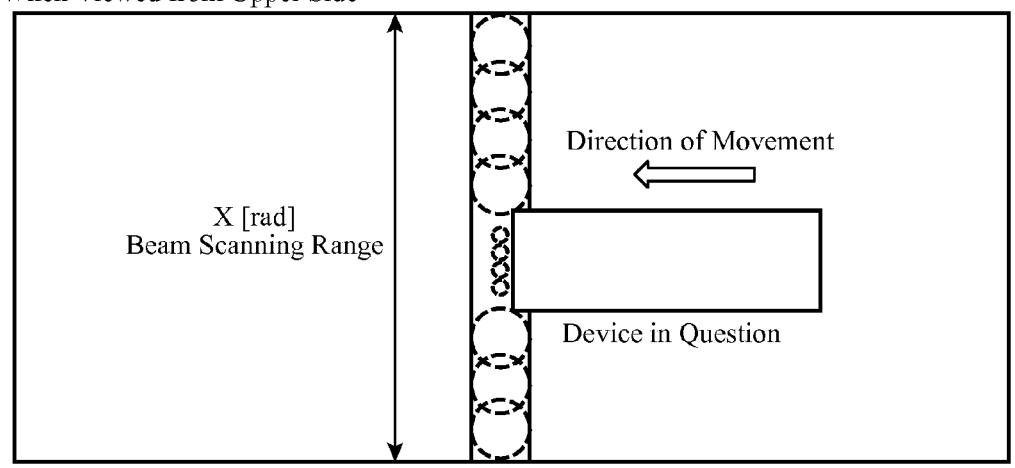

FIG.8

| Transmission Pulse Number | Beam Scanning Angle | Received Signal No. | Elapsed Time | Peak Intensity (in the Case of Single Acquisition) | Peak Intensity (in the Case of Plural Acquisitions) | Three Dimensional Coordinates | Current Position | Distance |
|---|---|---|---|---|---|---|---|---|
| 1 | $\theta_{beam1}$ | 1 | $T_1$ | P | $P_1$ | $(X_N, Y_N, Z_N)$ | $(X_{VN}, Y_{VN}, Z_{VN})$ | $L_N$ |
|  |  | 2 | $T_2$ |  | $P_2$ |  |  |  |
|  |  | ... | ... |  | ... |  |  |  |
|  |  | n | $T_n$ |  | $P_n$ |  |  |  |
|  |  | ... | ... |  | ... |  |  |  |
|  |  | N | $T_N$ |  | $P_N$ |  |  |  |
| 2 | $\theta_{beam2}$ | 1 | $T_1$ | P | $P_1$ | $(X_N, Y_N, Z_N)$ | $(X_{VN}, Y_{VN}, Z_{VN})$ | $L_N$ |
|  |  | 2 | $T_2$ |  | $P_2$ |  |  |  |
|  |  | ... | ... |  | ... |  |  |  |
|  |  | n | $T_n$ |  | $P_n$ |  |  |  |
|  |  | ... | ... |  | ... |  |  |  |
|  |  | N | $T_N$ |  | $P_N$ |  |  |  |

FIG.9

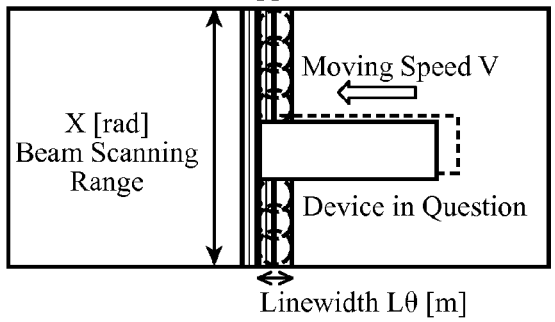

When Viewed from Upper Side

X [rad] Beam Scanning Range
Moving Speed V
Device in Question
Linewidth Lθ [m]

Moving Speed V'
Device in Question

Measurement Omission Occurs When Beam Scanning Rate with Respect to Moving Speed Is Not Appropriate Relational Expression of Each Parameter with Respect to Moving Speed $$V \leq H \cdot \theta \cdot f$$

Moving Speed V[m/s]
Beam Scanning Rate f[Hz]
Beam Divergence θ[rad]
Submarine Altitude H[m]

FIG.10

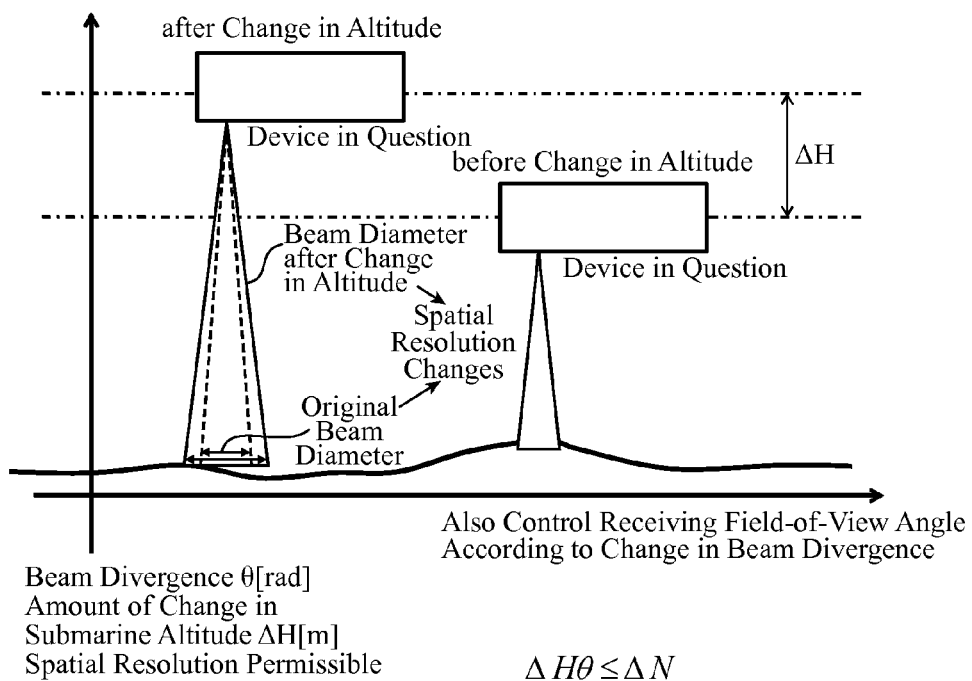

after Change in Altitude
Device in Question
before Change in Altitude
ΔH
Beam Diameter after Change in Altitude
Device in Question
Spatial Resolution Changes
Original Beam Diameter Also Control Receiving Field-of-View Angle According to Change in Beam Divergence Beam Divergence θ[rad]
Amount of Change in Submarine Altitude ΔH[m]
Spatial Resolution Permissible Variation Amount ΔN[m]

$$\Delta H \theta \leq \Delta N$$

FIG.11

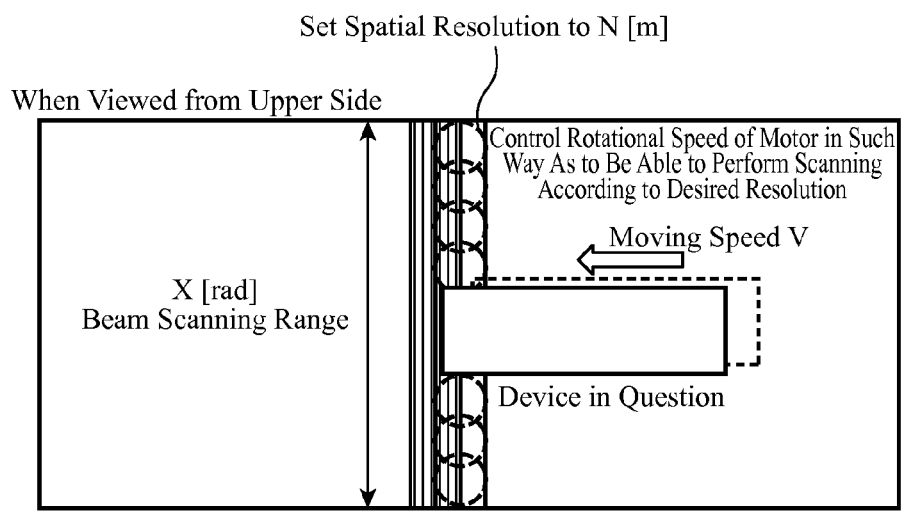

Set Spatial Resolution to N [m]

When Viewed from Upper Side

Control Rotational Speed of Motor in Such Way As to Be Able to Perform Scanning According to Desired Resolution Moving Speed V X [rad] Beam Scanning Range Device in Question The Number S of Pulses in One-Time Scanning S[pulse]
Beam Scanning Rate f[Hz]
Beam Scanning Range X[rad]
Spatial Resolution N[m]
Pulse Repetition Period R[Hz]
Submarine Altitude H[m]

$$S = \frac{HX}{N}$$

$$\frac{R}{f} = S$$

$$\Longrightarrow f = \frac{NR}{HX}$$

Scanning Rate Can Be Automatically Changed According to Change in Altitude H, from This Relational Expression When Improving Visibility of Intensity Image in This Situation, Pixel Values of Intensity Image Acquired Currently Are Analyzed and Parameter Is Reset in Such a Way That the Number of Saturated Pixels Is Equal to or Smaller Than the Permissible Number FIG.24
When Viewed from Lateral Side
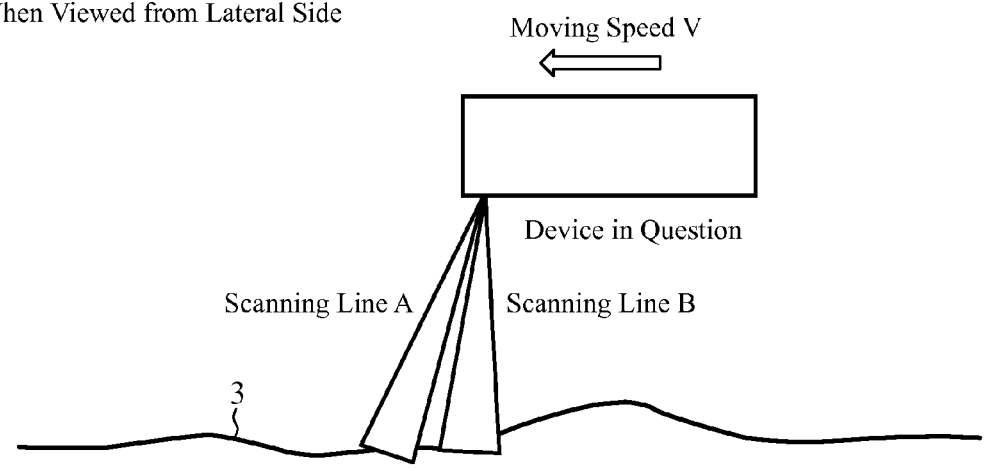
When Viewed from Upper Side
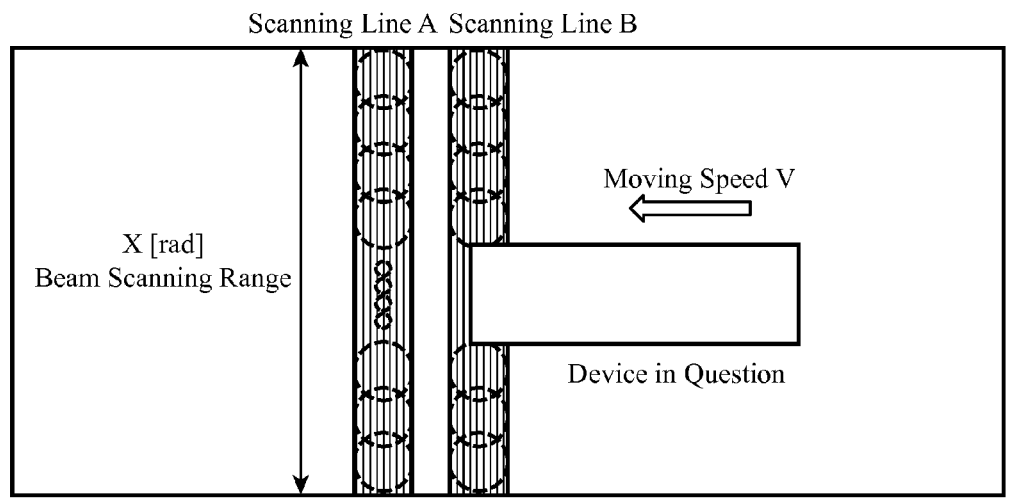

LASER RADAR DEVICE AND RADAR IMAGE GENERATING METHOD

FIELD OF THE INVENTION

The present invention relates to a laser radar device for and a radar image generating method of calculating the distance to a measurement plane from the difference between the time when laser light is transmitted and the time when reflected light is received, and also measuring the intensity of the reflected light.

BACKGROUND OF THE INVENTION

A laser radar device disclosed by the following patent references 1 measures the shape of an underwater object, and is mounted in a ship, an underwater moving object, or the like.

This laser radar device radiates laser light toward a measurement plane, and also receives the above-mentioned laser light which is reflected by the measurement plane and then returns thereto and measures the elapsed time that elapses from the time of radiating the laser light to the time of receiving laser light which is a reflected wave.

After measuring the elapsed time, this laser radar device calculates the distance from the moving object in which the device in question (laser radar device) is mounted to the measurement plane from the elapsed time, and images the distance.

While this laser radar device uses a one-dimensional array light receiver in order to be able to measure the detailed shape of a measurement plane at a short distance, the laser radar device does not have a function of changing the speed or the altitude of the device in question with respect to the measurement object, as needed, and a function of changing a specification of the laser light which is radiated toward the measurement plane (e.g., the beam divergence, the beam scanning period, the laser beam diameter, or the like) as needed.

RELATED ART DOCUMENT

Patent Reference

Patent reference 1: Japanese Unexamined Patent Application Publication No. Hei 3-6408 (third to fourth pages)

SUMMARY OF THE INVENTION

Problems to be Solved by the Invention

Because the conventional laser radar device is constructed as above, an omission in the measurement portions occurs on a distance image which is generated through the imaging when the speed of the moving object in which the device in question is mounted becomes higher than a speed which is determined from the distance to the measurement plane, the beam scanning period, and the beam divergence. A problem is, however, that because the laser radar device does not have the function of changing the physical relative relation between the measurement plane and the device in question and the function of changing a specification of the laser light which is radiated toward the measurement plane, it is difficult to prevent the occurrence of an omission in the measurement portions and the number of pixels each having a significant pixel value decreases.

A further problem is that even if the moving object in which the device in question is mounted is at rest, when the distance from the moving object in which the device in question is mounted to the measurement plane is long, the number of pixels each having a significant pixel value decreases.

The present invention is made in order to solve the above-mentioned problems, and it is therefore an object of the present invention to provide a laser radar device and a radar image generating method that prevent the occurrence of an omission in measurement portions in an image and reduction in the number of pixels each having a significant pixel value, and that ensure a sufficient number of pixels each having a significant pixel value.

Means for Solving the Problem

In accordance with the present invention, there is provided a laser radar device including: a laser light transmitter and receiver to radiate laser light toward a measurement object while changing a beam scanning angle, and receive the above-mentioned laser light which is reflected by the measurement object and then returns thereto; an elapsed time measurer to measure the elapsed time that elapses from the time when the laser light is radiated from the laser light transmitter and receiver to the time when the laser light is received by the laser light transmitter and receiver; a distance calculator to calculate the distance from the device in question to the measurement object by using the elapsed time measured by the elapsed time measurer; an imager to image the distance calculated by the distance calculator; a quality determinator to determine whether image quality showing either the number of pixels each having a measured distance value or a degree of omission in measurement portions, in an image generated by the imager, satisfies reference quality; and a relative relation changer to change at least one of the speed and the altitude of the device in question with respect to the measurement object when the quality determinator determines that the image quality does not satisfy the reference quality, in which the quality determinator determines whether an omission in measurement portions occurs in the image generated by the imager from a relation among the speed of a moving object in which the device in question is mounted, the altitude of the moving object, a beam divergence, and a beam scanning rate, and, when an omission in measurement portions occurs, determines that the image quality does not satisfy the reference quality.

Advantages of the Invention

Because the laser radar device in accordance with the present invention is configured in such a way that the quality determinator to determine whether the image quality showing either the number of pixels each having a measured distance value or the degree of omission in measurement portions, in the image generated by the imager, satisfies the reference quality is disposed, and, when the quality determinator determines that the image quality does not satisfy the reference quality, the relative relation changer changes at least one of the speed and the altitude of the device in question with respect to the measurement object, there is provided an advantage of being able to prevent the occurrence of an omission in measurement portions in the image and reduction in the number of pixels each having a sig-

BRIEF DESCRIPTION OF THE FIGURES

FIG. 5 is an explanatory drawing showing a state in which the laser radar device mounted in an underwater moving object 1 moving underwater measures a seafloor surface;

FIG. 8 is an explanatory drawing showing an example of data stored in a data storage unit 35;

FIG. 9 is an explanatory drawing showing a limited condition of a moving speed that an omission in measurement portions occurs;

FIG. 10 is a conceptual diagram showing a relation of a resolution variation with respect to an altitude change;

FIG. 11 is a conceptual diagram showing an equation for deriving a beam scanning period;

FIG. 24 is an explanatory drawing showing a state in which the laser radar device mounted in an underwater moving object 1 moving underwater measures a seafloor surface.

EMBODIMENTS OF THE INVENTION

Hereafter, in order to explain this invention in greater detail, the preferred embodiments of the present invention will be described with reference to the accompanying drawings.

Embodiment 1

Figure 1:
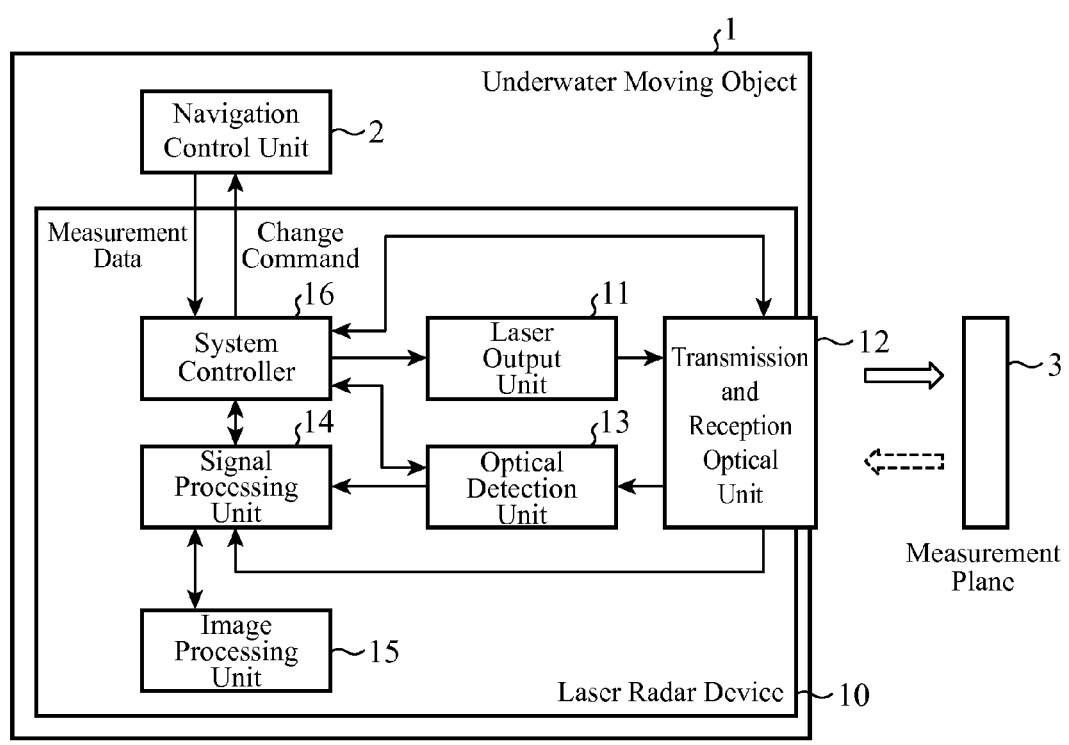
FIG. 1 is a block diagram showing a laser radar device in accordance with Embodiment 1 of the present invention.

FIG. 1 is a block diagram showing a laser radar device in accordance with Embodiment 1 of the present invention.

Referring to FIG. 1, an underwater moving object 1 has the laser radar device 10 installed therein, and corresponds to an underwater vehicle, a submarine, or the like that navigates while measuring its current position (absolute position) by using an inertial navigation function or a GPS receiving function.

A navigation control unit 2 of the underwater moving object 1 performs a process of collecting measurement data showing the speed and the submarine altitude (depth) of the underwater moving object 1 from a speed meter, an altimeter, and so on of the underwater moving object 1, and outputting the measurement data to the laser radar device 10, and also measuring the current position of the underwater moving object 1 and outputting data about the measured position to the laser radar device 10, and also performs a process of controlling the speed or the submarine altitude of the underwater moving object 1 according to a speed change command or an altitude change command which is outputted from the laser radar device 10.

A measurement plane 3 is a measurement object of the laser radar device 10. For example, the measurement plane corresponds to a seafloor surface, a floating matter, or the like.

A laser output unit 11 includes a laser light source to generate pulse laser light, and performs a process of, when receiving a command to output pulse laser light from a system controller 16, outputting the pulse laser light generated by the laser light source to a transmission and reception optical unit 12.

The transmission and reception optical unit 12 performs a process of radiating the pulse laser light (transmission light) outputted from the laser output unit 11 toward the measurement plane 3 while changing a beam scanning angle under control by the system controller 16, and receiving the pulse laser light (received light) which is reflected by the measurement plane 3 and then returns thereto.

An optical detection unit 13 is equipped with a light receiver to convert the pulse laser light received by the transmission and reception optical unit 12 into an electric signal, and output the received signal which is the electric signal to a signal processing unit 14.

The optical detection unit 13 has a gate function of controlling a light receiving timing on the basis of an external signal, and a function of being able to change a light receiving gain on the basis of an external signal.

A laser light transmitter and receiver is configured with the laser output unit 11, the transmission and reception optical unit 12, and the optical detection unit 13.

The signal processing unit 14 consists of, for example, either a semiconductor integrated circuit equipped with a CPU, or a one chip microcomputer, and performs a process of measuring the elapsed time that elapses from the time when the pulse laser light is outputted from the laser output unit 11 to the time when the received signal is outputted from the optical detection unit 13, a process of calculating the distance from the underwater moving object 1 in which the device in question is mounted to the measurement plane 3 by using the elapsed time, a process of detecting the light intensity of the laser light received by the transmission and reception optical unit 12, and so on.

An image processing unit 15 consists of, for example, a GPU (Graphics Processing Unit) or the like, and performs a process of imaging the distance calculated by the signal processing unit 14 to output a distance image, a process of imaging the light intensity detected by the signal processing unit 14 to output alight intensity image, a process of imaging the three dimensional coordinates of measurement points which are calculated by the signal processing unit 14 to output a three dimensional coordinate image, and so on.

The image processing unit 15 also performs a process of generating a three-dimensional map from the three dimensional coordinates of the measurement points calculated by the signal processing unit 14.

The image processing unit 15 constructs an imager and a three-dimensional map generator.

The system controller 16 consists of, for example, either a semiconductor integrated circuit equipped with a CPU, or a one chip microcomputer, and performs a process of determining whether the quality of the distance image or the light intensity image which is generated by the image processing unit 15 satisfies reference quality, and a process of, when the quality of the distance image or the light intensity image does not satisfy the reference quality, changing the speed or the altitude of the device in question with respect to the measurement plane 3 by outputting a speed change command to lower the speed, an altitude change command to change the submarine altitude (depth), or the like to the navigation control unit 2. As an alternative, the system controller performs a process of changing a specification of the laser light radiated from the laser light transmitter and receiver 12 (e.g., the beam divergence, the beam scanning period, the pulse repetition period, or the like) within limits at which the amount of variation in the spatial resolution does not exceed a permissible amount. The system controller 16 constructs a quality determinator and a relative relation changer.

Although it is assumed in the example shown in FIG. 1 that the laser output unit 11, the transmission and reception optical unit 12, the optical detection unit 13, the signal processing unit 14, the image processing unit 15, and the system controller 16, which are the components of the laser radar device, consist of pieces of hardware for exclusive use, respectively, all or a part of the laser radar device can alternatively consist of a computer.

For example, in a case in which a part of the laser radar device (e.g., the signal processing unit 14, the image processing unit 15, and the system controller 16) consists of a computer, a program in which the details of processing performed by the signal processing unit 14, the image processing unit 15, and the system controller 16 are described can be stored in a memory of the computer, and a CPU of the computer can be made to execute the program stored in the memory.

Figure 4:
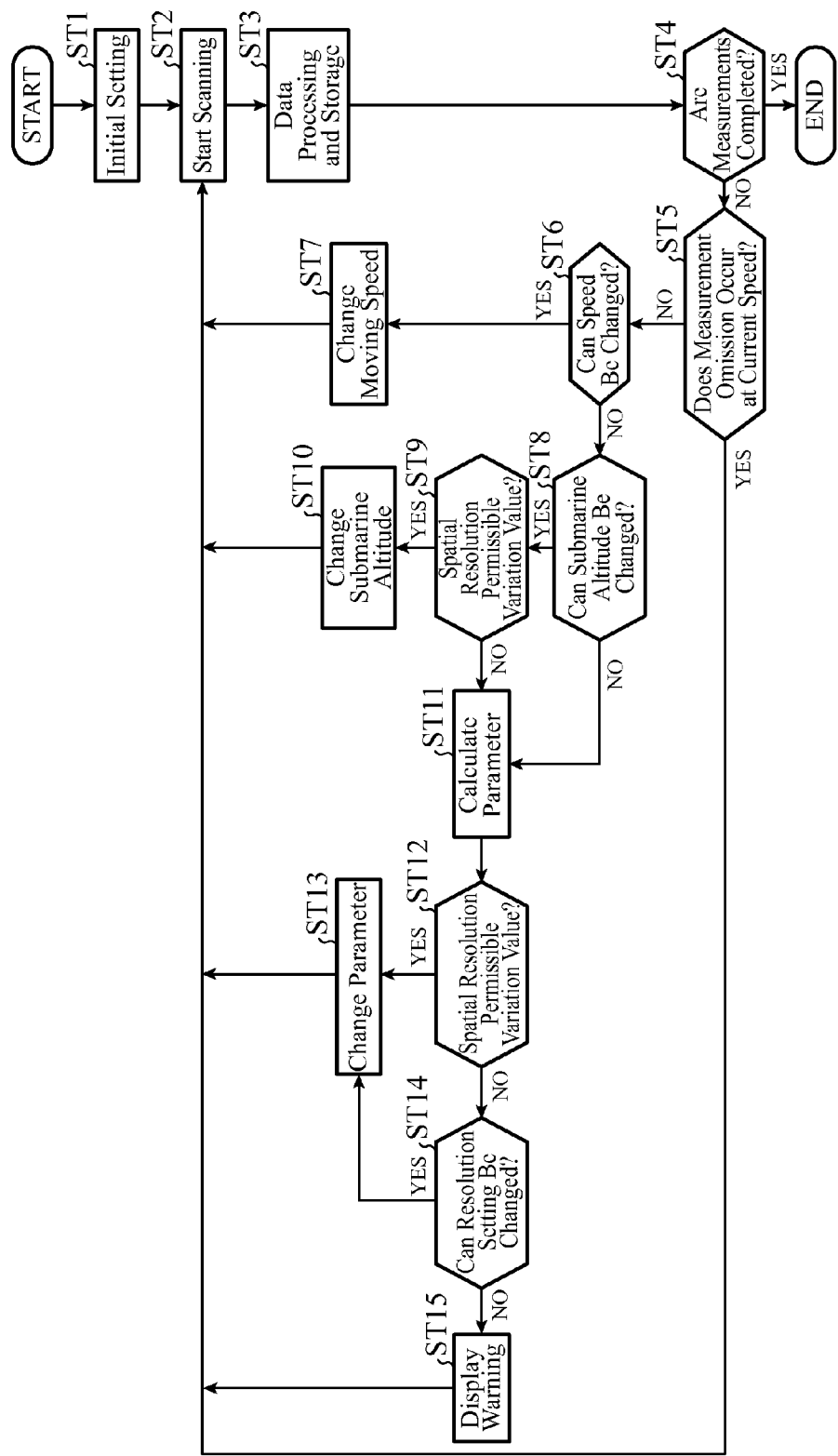
FIG. 4 is a flowchart showing the details of processing (radar image generating method) performed by the laser radar device in accordance with Embodiment 1 of the present invention.

FIG. 4 is a flow chart showing the details of processing (radar image generating method) performed by the laser radar device in accordance with Embodiment 1 of the present invention.

Figure 2:
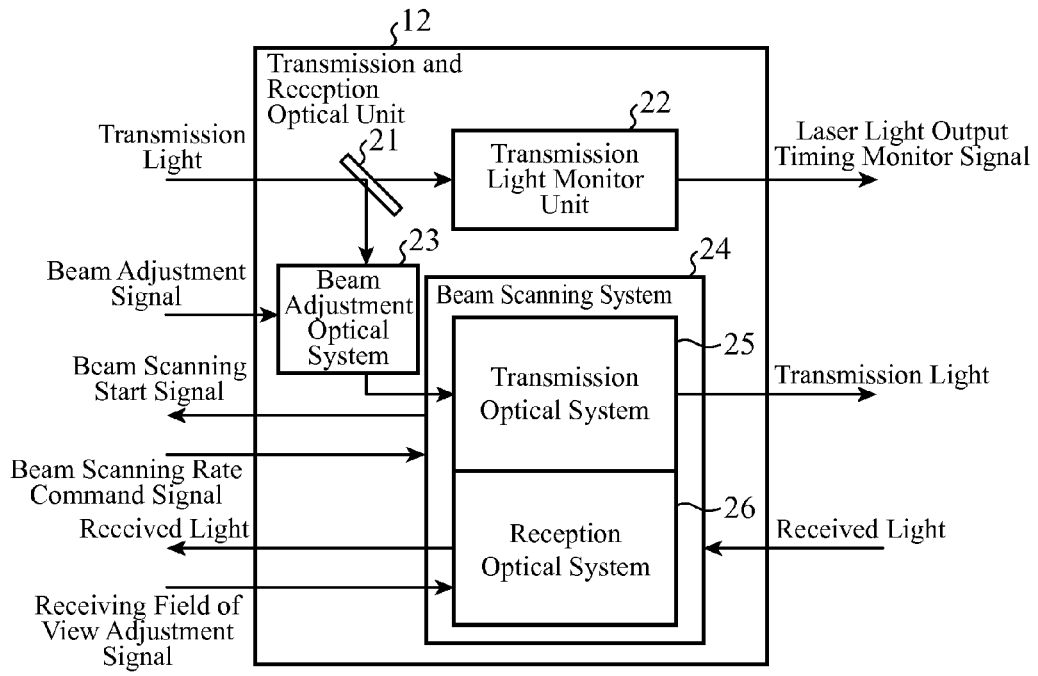
FIG. 2 is a block diagram showing a transmission and reception optical unit 12 of the laser radar device in accordance with Embodiment 1 of the present invention.

FIG. 2 is a block diagram showing the transmission and reception optical unit 12 of the laser radar device in accordance with Embodiment 1 of the present invention.

Referring to FIG. 2, a laser light brancher 21 consists of, for example, an optical element for taps, such as a flat window, and performs a process of splitting the pulse laser light (transmission light) outputted from the laser output unit 11 into pulse laser light beams to output one of the pulse laser light beams to a beam adjustment optical system 23 and output the other one of the pulse laser light beams to a transmission light monitor unit 22. The pulse laser light outputted to the transmission light monitor unit 22 is slight while most of the pulse laser light is outputted to the beam adjustment optical system 23.

The transmission light monitor unit 22 performs a process of converting the pulse laser light outputted from the laser light brancher 21 into an electric signal and outputting the electric signal to the signal processing unit 14 as a laser light output timing monitor signal.

The beam adjustment optical system 23 is an optical system to adjust the beam diameter and the beam divergence of the pulse laser light according to a beam adjustment signal outputted from the system controller 16 and output the pulse laser light after adjustment to a beam scanning system 24.

The beam scanning system 24 is equipped with a transmission optical system 25 and a reception optical system 26, and performs a process of changing the beam scanning angle of the pulse laser light radiated from the transmission optical system 25 at a beam scanning rate (beam scanning period) shown by a beam scanning rate command signal outputted from the system controller 16, and also outputting a beam scanning start signal showing a start timing of the beam scanning to the signal processing unit 14.

The transmission optical system 25 is an optical system to radiate the pulse laser light (transmission light) whose beam scanning angle is changed by the beam scanning system 24 and which is simultaneously adjusted by the beam adjustment optical system 23 toward the measurement plane 3.

The reception optical system 26 is an optical system to focus, onto the optical detection unit 13, the pulse laser light (received light) which is reflected by the measurement plane 3 and then returns thereto after the receiving field of view thereof is adjusted according to a receiving field of view adjustment signal outputted from the system controller 16.

Although the example in which the transmission optical system 25 and the reception optical system 26 are disposed as different optical systems is shown in FIG. 2, a transmission and reception optical system 26 that functions as both the transmission optical system 25 and the reception optical system 26 can be alternatively installed in the beam scanning system 24.

Figure 3:
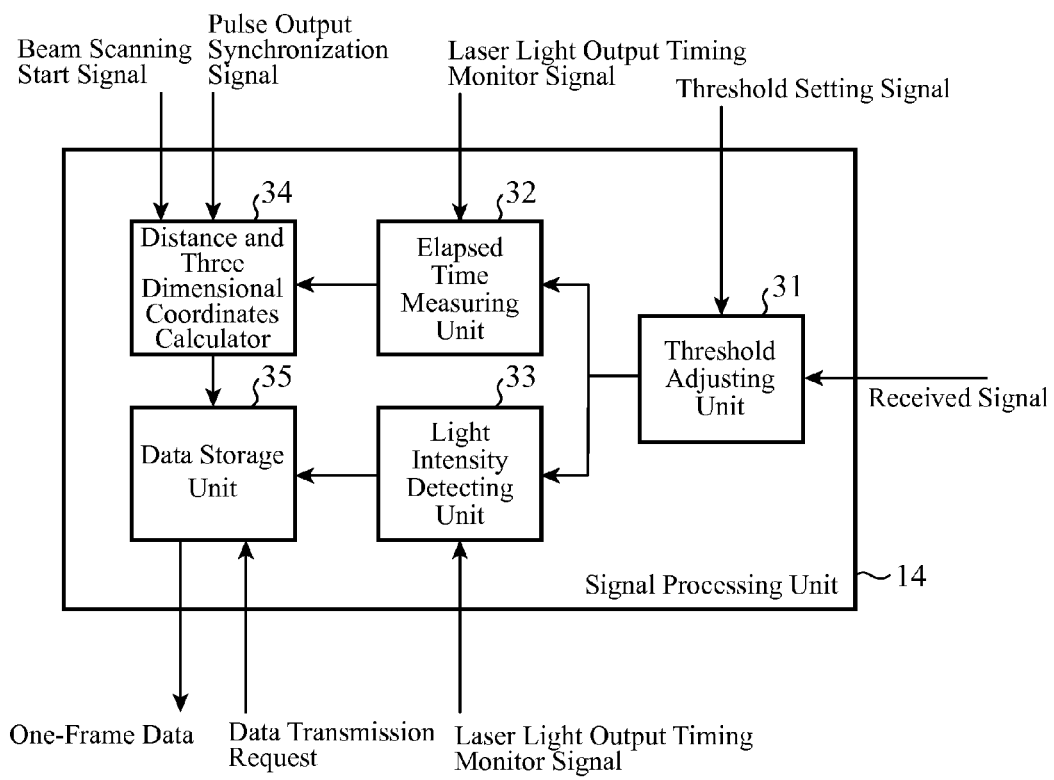
FIG. 3 is a block diagram showing a signal processing unit 14 of the laser radar device in accordance with Embodiment 1 of the present invention.

FIG. 3 is a block diagram showing the signal processing unit 14 of the laser radar device in accordance with Embodiment 1 of the present invention.

Referring to FIG. 3, a threshold adjusting unit 31 performs a process of, only when a received signal threshold (reference level) which is shown by a threshold setting signal outputted from the system controller 16 is set, and the signal level of the received signal outputted from the optical detection unit 13 is equal to or higher than the received signal threshold, outputting the received signal to an elapsed time measuring unit 32 and a light intensity detecting unit 33. The threshold adjusting unit 31 constructs a received signal selector.

The elapsed time measuring unit 32 performs a process of measuring the elapsed time that elapses from the time when the laser light output timing monitor signal is outputted from the transmission light monitor unit 22 of the transmission and reception optical unit 12 to the time when the received signal is outputted from the threshold adjusting unit 31. The elapsed time measuring unit 32 constructs an elapsed time measurer.

The light intensity detecting unit 33 performs a process of starting a peak holding process of holding the peak of the received signal outputted from the threshold adjusting unit 31 from the time when the laser light output timing monitor signal is outputted from the transmission light monitor unit 22 of the transmission and reception optical unit 12, and outputting the peak hold value of the received signal to a data storage unit 35 as the light intensity of the laser light received by the transmission and reception optical unit 12. The light intensity detecting unit 33 constructs a light intensity detector.

A distance and three dimensional coordinate calculator 34 performs a process of calculating the distance from the underwater moving object 1 in which the device in question is mounted to the measurement plane 3 by using the elapsed time measured by the elapsed time measuring unit 32.

The distance and three dimensional coordinate calculator 34 also performs a process of counting the number of pulse output synchronization signals outputted from the system controller 16 (signals each of which is outputted from the system controller 16 in synchronization with the output of the pulse laser light in the laser output unit 11) from the time when the beam scanning start signal is outputted from the beam scanning system 24 of the transmission and reception optical unit 12, to calculate the current beam scanning angle from the counted value, and calculating the three dimensional coordinates of a measurement point on the measurement plane 3 from both the distance from the underwater moving object 1 to the measurement plane 3, and the current beam scanning angle.

The distance and three dimensional coordinate calculator 34 constructs a distance calculator and a three dimensional coordinate calculator.

The data storage unit 35 consists of, for example, a storage, such as a RAM or a hard disk, and stores the distance to the measurement plane 3 and the three dimensional coordinates of the measurement point which are calculated by the distance and three dimensional coordinate calculator 34, and the light intensity of the laser light detected by the light intensity detecting unit 33.

Next, operations will be explained.

In this Embodiment 1, an example in which the measurement plane 3 is a seafloor surface, and the laser radar device measures the shape of the seafloor surface by performing one-dimensional line scanning on the measurement plane 3 while the underwater moving object 1 moves underwater will be explained.

FIG. 5 is an explanatory drawing showing a state in which the laser radar device mounted in the underwater moving object 1 moving underwater measures the measurement plane 3 which is a seafloor surface.

The system controller 16 of the laser radar device 10 initializes each of the processing units before starting measurements on the measurement plane 3 (step ST1 of FIG. 4).

More specifically, the system controller 16 initializes the pulse repetition period R, the pulse width, and the laser power of the pulse laser light outputted from the laser output unit 1.

The system controller 16 also outputs a beam scanning rate command signal showing the beam scanning rate f (beam scanning period) to the beam scanning system 24 of the transmission and reception optical unit 12, thereby setting the beam scanning rate f, and also outputs a beam adjustment signal showing the beam diameter and the beam divergence $\theta$ of the pulse laser light to the beam adjustment optical system 23 of the transmission and reception optical unit 12, thereby initializing the beam diameter and the beam divergence $\theta$ of the pulse laser light.

The system controller 16 further outputs a receiving field of view adjustment signal showing the receiving field of view to the reception optical system 26 of the transmission and reception optical unit 12, thereby initializing the viewing angle in such a way that the receiving field of view of the reception optical system 26 becomes a range equivalent to that of the pulse laser light (transmission light) radiated from the transmission optical system 25.

The system controller 16 also initializes the receiving gain of the optical detection unit 2, and also outputs a threshold setting signal showing the received signal threshold (reference level) to the threshold adjusting unit 31 of the signal processing unit 14, thereby initializing the received signal threshold.

After completing the initial setting of each of the processing units, the system controller 16 outputs a command to output pulse laser light to the laser output unit 11, thereby starting one-dimensional line scanning on the measurement plane 3 (step ST2).

Although the system controller 16 outputs a command to perform one-dimensional beam scanning to the beam scanning system 24 in order to perform one-dimensional line scanning on the measurement plane 3 in this embodiment, the system controller 16 can alternatively output a command to perform two-dimensional beam scanning to the beam scanning system 24 when performing two-dimensional scanning on the measurement plane 3.

When receiving the command to output pulse laser light from the system controller 16, the laser output unit 11 repeatedly outputs pulse laser light to the transmission and reception optical unit 12 at pulse repetition periods of R which is initially set.

The pulse width and the laser power of the pulse laser light which is outputted from the laser output unit 11 have values as initially set.

When the laser output unit 11 starts outputting the pulse laser light, the system controller 16 outputs a pulse output synchronization signal to the distance and three dimensional coordinate calculator 34 of the signal processing unit 14 in synchronization with the output of the pulse laser light in the laser output unit 11.

Every time when the pulse laser light (transmission light) is outputted from the laser output unit 11, the laser light brancher 21 of the transmission and reception optical unit 12 splits the pulse laser light (transmission light) into pulse laser light beams, and outputs one of the pulse laser light beams to the beam adjustment optical system 23 and outputs the other one of the pulse laser light beams to the transmission light monitor unit 22.

As mentioned above, the pulse laser light outputted to the transmission light monitor unit 22 is slight while most of the pulse laser light is outputted to the beam adjustment optical system 23.

When receiving the pulse laser light from the laser light brancher 21, the transmission light monitor unit 22 converts the pulse laser light into an electric signal and outputs the electric signal to the elapsed time measuring unit 32 and the light intensity detecting unit 33 of the signal processing unit 14 as a laser light output timing monitor signal.

When receiving the pulse laser light from the laser light brancher 21, the beam adjustment optical system 23 of the transmission and reception optical unit 12 adjusts the beam diameter and the beam divergence θ of the pulse laser light according to the beam adjustment signal which is outputted from the system controller 16 at the initial setting time, and outputs the pulse laser light after adjustment to the beam scanning system 24.

When receiving the pulse laser light after adjustment from the beam adjustment optical system 23, the transmission optical system 25 of the beam scanning system 24 radiates the pulse laser light (transmission light) toward the measurement plane 3.

At that time, every time when the beam scanning system 24 receives the pulse laser light after adjustment from the beam adjustment optical system 23, the beam scanning system 24 changes the beam scanning angle $\theta_{beam}$ of the pulse laser light radiated from the transmission optical system 25 at the beam scanning rate f (beam scanning period) shown by the beam scanning rate command signal which is outputted from the system controller 16 at the initial setting time.

Further, when receiving the pulse laser light after adjustment from the beam adjustment optical system 23 for the first time, the beam scanning system 24 outputs a beam scanning start signal showing a start timing of the beam scanning to the signal processing unit 14.

In the reception optical system 26 of the transmission and reception optical unit 12, the receiving field of view is adjusted according to the receiving field of view adjustment signal outputted from the system controller 16. The reception optical system focuses the pulse laser light (received light) which is reflected by the measurement plane 3 and then returns thereto after being radiated from the transmission optical system 25 onto the optical detection unit 13.

By adjusting the receiving field of view of the reception optical system 26 according to the receiving field of view adjustment signal, the receiving field of view can be narrowed down to the order of the beam irradiation range on the measurement plane 3. Therefore, the incidence of surrounding scattered light can be prevented and the reflected light from the measurement plane 3 can be received with a good SN ratio.

The optical detection unit 13 converts the pulse laser light focused by the reception optical system 26 of the transmission and reception optical unit 12 into an electric signal with the light receiving gain which is initially set by the system controller 16, and outputs the received signal which is the electric signal to the signal processing unit 14.

When receiving the received signal from the optical detection unit 13, the signal processing unit 14 performs various signal processes on the received signal (step ST3).

Hereafter, the details of the processes performed by the signal processing unit 14 will be explained concretely.

When receiving the received signal from the optical detection unit 13, the threshold adjusting unit 31 of the signal processing unit 14 compares the signal level of the received signal (the voltage of a voltage signal) with the received signal threshold (reference level) shown by the threshold setting signal which is outputted from the system controller 16 at the initial setting time, and, when the signal level of the received signal is equal to or higher than the received signal threshold, outputs the received signal to the elapsed time measuring unit 32 and the light intensity detecting unit 33.

In contrast, when the signal level of the received signal is lower than the received signal threshold, the threshold adjusting unit discards the received signal in order to cancel the signal having a noise level.

The elapsed time measuring unit 32 measures the elapsed time T that elapses from the time when the laser light output timing monitor signal is outputted from the transmission light monitor unit 22 of the transmission and reception optical unit 12 to the time when the received signal is outputted from the threshold adjusting unit 31.

When a certain floating matter exists while even a single pulse of the laser light radiated from the transmission optical system 25 of the transmission and reception optical unit 12 propagates from the device in question to the measurement plane 3, pulse laser light (received light) reflected by the floating matter, in addition to the pulse laser light (received light) reflected by the measurement plane 3, is received at a single laser light output timing.

In such a case, because a plurality of received signals are outputted from the threshold adjusting unit 31, the elapsed time measuring unit 32 measures the elapsed time T that elapses from the time when the laser light output timing monitor signal is outputted to the time when each received signal is outputted.

Hereafter, when N received signals are outputted, the elapsed time corresponding to the n-th received signal is expressed by $T_n$ (n=1, 2, . . . , N).

By the way, because a floating matter or the like exists between the device in question and the measurement plane 3 and is therefore closer in distance to the device in question than to the measurement plane 3, pulse laser light (received light) reflected by a floating matter or the like is received at an earlier time than that at which the pulse laser light (received light) reflected by the measurement plane 3 is received. Therefore, the elapsed time T that elapses to the time when a received signal of pulse laser light (received light) reflected by a floating matter or the like is outputted is shorter than the elapsed time T that elapses to the time when the received signal of the pulse laser light (received light) reflected by the measurement plane 3 is outputted.

When a predetermined time elapses after measuring the elapsed time $T_n$ that elapses to the time when each of a plurality of received signals is outputted, the time measurement process in the elapsed time measuring unit 32 is stopped automatically, and the times which have been measured are reset.

The light intensity detecting unit 33 starts the process of holding the peak of the received signal outputted from the threshold adjusting unit 31 from the time when the laser light output timing monitor signal is outputted from the transmission light monitor unit 22 of the transmission and reception optical unit 12, and outputs the peak hold value P of the received signal to the data storage unit 35 as the light intensity of the laser light received by the transmission and reception optical unit 12.

For example, when recognizing a pulse rise having a fixed voltage change, the light intensity detecting unit detects the peak voltage value (peak hold value of the received signal) appearing until recognizing a fall of the pulse.

When a plurality of received signals are outputted from the threshold adjusting unit 31, the light intensity detecting unit performs the process of holding the peak of each of the received signals and outputting the peak hold value of each of the received signals to the data storage unit 35.

Hereafter, when N received signals are outputted, the peak hold value of the n-th received signal is expressed by $P_n$ (n=1, 2, . . . , N).

When N pulse laser light beams (received light beams) are received at a single laser light output timing, because the elapsed times $T_1$ to $T_N$ respectively corresponding to the N received signals are outputted from the elapsed time measuring unit 32 while the pulse laser light (received light) reflected by the measurement plane 3 is received last, the distance and three dimensional coordinate calculator 34 calculates the distance $L_N$ from the underwater moving object 1 in which the device in question is mounted to the measurement plane 3 by using the elapsed time $T_N$ corresponding to the N-th received signal, as shown in the following equation (1).

$$L_N = \frac{c}{2r} T_N \quad (1)$$

In the equation (1), c denotes the speed of light and r denotes the refractive index of the propagation space.

Further, the distance and three dimensional coordinate calculator 34 starts counting the number of pulse output synchronization signals (the counted number $N_p$ of pulses) outputted from the system controller 16 (signals each of which is outputted from the system controller 16 in synchronization with the output of the pulse laser light in the laser output unit 11) from the time when the beam scanning start signal is outputted from the beam scanning system 24 of the transmission and reception optical unit 12, and calculates the current beam scanning angle $\theta_{beam}$ from the counted number $N_p$ of pulses, as shown in the following equation (2).

$$\theta_{beam} = -\frac{X}{2} + \frac{fX}{R} N_p \quad (2)$$

In the equation (2), X denotes a beam scanning range, f denotes the beam scanning rate (beam scanning period), and R denotes the pulse repetition period.

Figure 6:
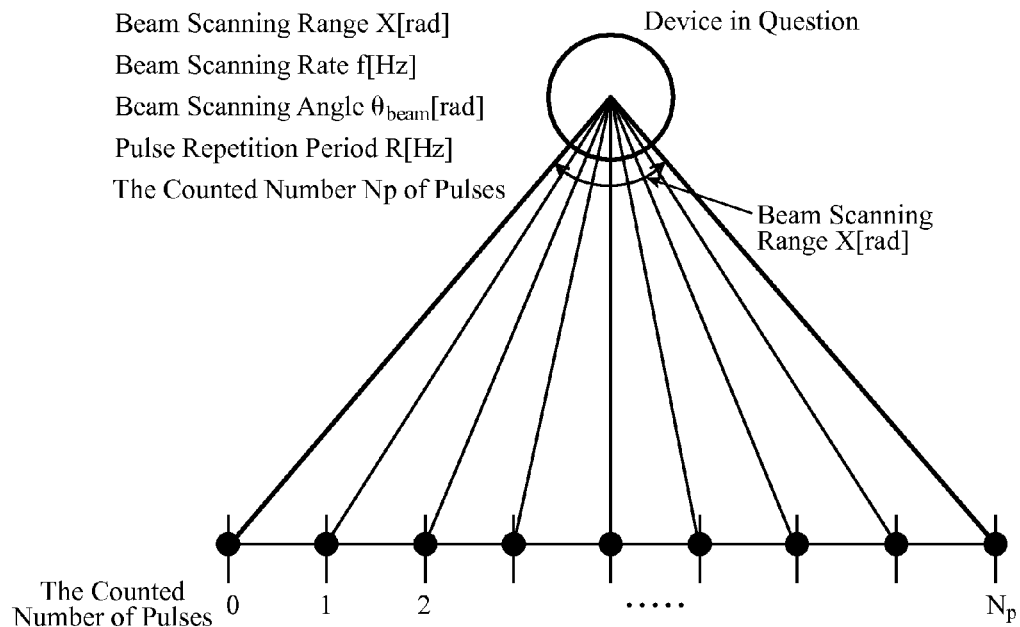
FIG. 6 is a conceptual diagram showing a relation between the counted number $N_p$ of pulses and a beam scanning angle $\theta_{beam}$.

FIG. 6 is a conceptual diagram showing a relation between the counted number $N_p$ of pulses and the beam scanning angle $\theta_{beam}$.

After calculating the distance $L_N$ from the underwater moving object 1 to the measurement plane 3 and the current beam scanning angle $\theta_{beam}$, the distance and three dimensional coordinate calculator 34 calculates the three dimensional coordinates $(X_N, Y_N, Z_N)$ of the measurement point on the measurement plane 3 with the position of the device in question being defined as the point of origin by using the distance $L_N$ and the beam scanning angle $\theta_{beam}$, as shown in the following equation (3).

$$X_N = 0$$

$$Y_N = -L_N \sin \theta_{beam}$$

$$Z_N = L_N \cos \theta_{beam} \quad (3)$$

Figure 7:
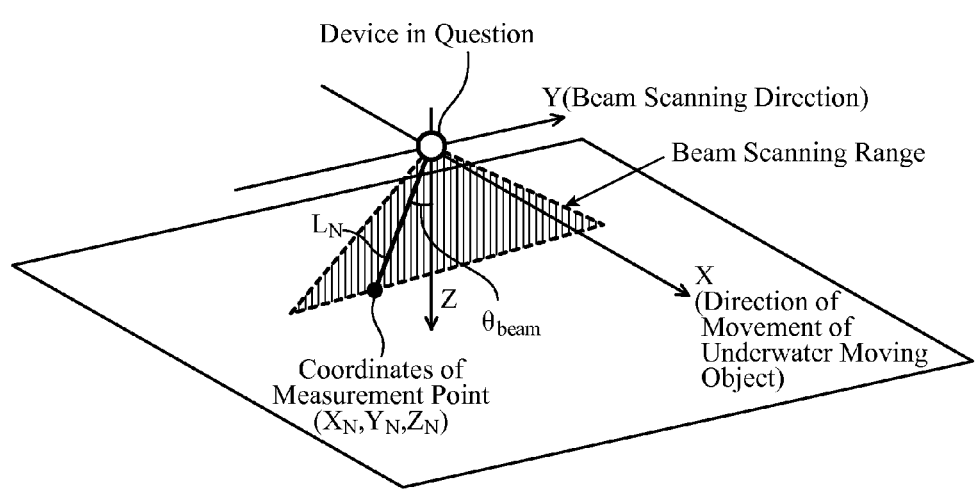
FIG. 7 is an explanatory drawing showing a measurement state and a coordinate system of the laser radar device.

FIG. 7 is an explanatory drawing showing a measurement state and the coordinate system of the laser radar device.

Although the equation (3) is a computation expression in a case in which the pulse laser light radiated from the laser radar device 10 is perpendicular to the traveling direction of the underwater moving object 1, the pulse laser light can be alternatively radiated in a direction of an angle θm with respect to the traveling direction of the underwater moving object 1.

In that case, the three dimensional coordinates $(X_N, Y_N, Z_N)$ are calculated as shown in the following equation (4).

$$X_N = L_N \cos \theta_m$$

$$Y_N = -L_N \sin \theta_{beam} \sin \theta_m$$

$$Z_N = L_N \cos \theta_{beam} \sin \theta_m \quad (4)$$

The data storage unit 35 stores the distance $L_N$ to the measurement plane 3 and the three dimensional coordinates $(X_N, Y_N, Z_N)$ of the measurement point which are calculated by the distance and three dimensional coordinate calculator 34, and also stores the light intensities $P_1$ to $P_N$ of the laser light beams of one frame which are detected by the light intensity detecting unit 33.

At that time, because the system controller 16 inquires of the navigation control unit 2 of the underwater moving object 1 about the current position of the underwater moving object 1 to acquire measurement data about the current position, the data storage unit 35 stores the current position $(X_{vN}, Y_{vN}, Z_{vN})$ of the underwater moving object 1 which is shown by the measurement data.

FIG. 8 is an explanatory drawing showing an example of the data stored in the data storage unit 35.

The image processing unit 15 reads the distances $L_N$ respectively corresponding to the plurality of pulse laser light beams (transmission light beams) from the data storage unit 35, and images those distances $L_N$ and displays the distance image on a display not shown.

The image processing unit 15 also reads the light intensities $P_N$ of the laser light beams respectively corresponding to the plurality of pulse laser light beams (transmission light beams) from the data storage unit 35, and images those light intensities $P_N$ and displays the light intensity image on the display not shown.

The image processing unit 15 further reads the plurality of three dimensional coordinates $(X_N, Y_N, Z_N)$ respectively corresponding to the plurality of pulse laser light beams (transmission light beams) from the data storage unit 35, and images those three dimensional coordinates $(X_N, Y_N, Z_N)$ and displays the three dimensional coordinate image on the display not shown.

In addition, the image processing unit 15 generates a three-dimensional map from those three dimensional coordinates $(X_N, Y_N, Z_N)$.

After that, the system controller 16 determines whether or not to end the measurements (step ST4), and, when ending the measurements, ends the series of processes, whereas when continuing the measurements, the system controller inquires of the navigation control unit 2 of the underwater moving object 1 about the current moving speed and the current submarine altitude (depth).

The navigation control unit 2 of the underwater moving object 1 collects the measurement data showing the speed V and the submarine altitude H of the underwater moving object 1 from the speed meter, and, when receiving an inquiry about the moving speed and the submarine altitude from the system controller 16, outputs the measurement data showing the speed V and the submarine altitude H of the underwater moving object 1 to the system controller 16.

When receiving the measurement data from the navigation control unit 2 of the underwater moving object 1, the system controller 16 determines whether an omission in the measurement portions occurs in the distance image or the light intensity image generated by the image processing unit 15 from a relation among the speed V of the underwater moving object 1, which is shown by the measurement data, the submarine altitude H of the underwater moving object 1, and the beam divergence θ and the beam scanning rate f (beam scanning period) (step ST5).

FIG. 9 is an explanatory drawing showing a limited condition of the moving speed that an omission in the measurement portions occurs, and, when a relation given by the following inequality (5) is not satisfied, it is determined that an omission in the measurement portions occurs in the distance image or the light intensity image.

$$V \leq H \cdot \theta \cdot f \qquad (5)$$

The right-hand side of the equation (5) shows a speed at which the underwater moving object moves a distance equal to the beam diameter on the measurement plane 3 during the scanning time required for one line. Because when the underwater moving object 1 moves at a speed exceeding the above-mentioned speed, scanning will be performed with a gap equal to or greater than the beam diameter in the next scanning line, measurements with a uniform point density become impossible.

When determining that an omission in the measurement portions occurs, the system controller 16 determines that the degree of omission in measurement portions of the distance image or the light intensity image does not satisfy a reference degree.

When determining that no omission in the measurement portions occurs and the quality of the distance image or the light intensity image satisfies the reference quality, the system controller 16 starts the next scanning with the same settings as those previously made (step ST2).

When determining that an omission in the measurement portions occurs and the quality of the distance image or the light intensity image does not satisfy the reference quality, the system controller 16 inquires of the navigation control unit 2 whether or not it is possible to change the moving speed.

When receiving an answer showing that the moving speed can be changed from the navigation control unit 2 (step ST6), the system controller 16 outputs a speed change command to lower the speed to a speed at which the equation (5) is established to the navigation control unit 2.

The navigation control unit 2 changes the speed V of the underwater moving object 1 according to the speed change command outputted from the system controller 16 (step ST7).

When not receiving any answer showing that the moving speed can be changed from the navigation control unit 2, the system controller 16 inquires of the navigation control unit 2 whether or not it is possible to change the submarine altitude (whether a change in the submarine altitude causes a problem from the viewpoint of navigation).

When receiving an answer showing that the submarine altitude can be changed from the navigation control unit 2 (step ST8), the system controller 16 performs determination of whether or not it is possible to change the altitude, the determination being based on a spatial resolution permissible variation amount for the measurement points (step ST9).

FIG. 10 is a conceptual diagram showing a relation of a resolution variation with respect to an altitude change.

A change of the submarine altitude has an influence upon the spatial resolution of the measurement points, as shown in FIG. 10. Therefore, as the determination of whether or not it is possible to change the submarine altitude, whether the amount of altitude change ΔH from the current submarine altitude H to the submarine altitude satisfying the equation (5) satisfies the following inequality (6) with respect to the permissible variation amount ΔN of the spatial resolution is checked to see.

$$\Delta H \theta \leq \Delta N \qquad (6)$$

When the amount of altitude change satisfies the equation (6), the system controller 16 outputs an altitude change command to change the current submarine altitude to the new submarine altitude H to the navigation control unit 2.

The navigation control unit 2 changes the submarine altitude H of the underwater moving object 1 according to the altitude change command outputted from the system controller 16 (step ST10).

After the navigation control unit 2 changes the submarine altitude H of the underwater moving object 1, the system controller 16 starts the next scanning (step ST2).

When the amount of altitude change does not satisfy the equation (6), the system controller 16 calculates a new beam divergence θ satisfying the equation (6).

After calculating the new beam divergence θ, the system controller 16 calculates a new beam scanning rate f (beam scanning period) satisfying the equation (5) by using the beam divergence θ, the submarine altitude H after change, and the current moving speed V (step ST11).

FIG. 11 is a conceptual diagram showing an equation for deriving the beam scanning period, and a relational expression (the following equation (7)) among the spatial resolution N, the pulse repetition period R, the submarine altitude H, and the beam scanning range X is driven for the beam scanning rate f (beam scanning period).

$$f = \frac{NR}{HX} \qquad (7)$$

As a background to this relational expression, it is set that measurements are performed on the beam scanning range X with a prescribed number of pulses, and, by controlling the system in such a way as to obey this setting, a spatial resolution falling within the line scanning range can be maintained.

Next, the system controller 16 checks whether or not it is possible to maintain the measurements within a prescribed permissible range of spatial resolutions when using the new beam scanning rate f (beam scanning period) (step ST12).

More specifically, the system controller 16 substitutes the new beam scanning rate f, the current pulse repetition period R, the new submarine altitude H, and the current beam scanning range X into the equation (7), to calculate a new spatial resolution N, and, when the difference between this spatial resolution N and the current spatial resolution (the amount of variation in the spatial resolution) falls within the permissible range, determines that it is possible to maintain the measurements within the prescribed permissible range of spatial resolutions.

When it is possible to maintain the measurements within the prescribed permissible range of spatial resolutions, the system controller 16 outputs a beam scanning rate command signal showing the new beam scanning rate f (beam scanning period) to the beam scanning system 24 of the transmission and reception optical unit 12, thereby setting the new beam scanning rate f, and also outputs a beam adjustment signal showing the new beam divergence θ to the beam adjustment optical system 23 of the transmission and reception optical unit 12, thereby setting the new beam divergence θ (step ST13).

The system controller 16 also outputs an altitude change command to change the current submarine altitude to the new submarine altitude H to the navigation control unit 2.

The navigation control unit 2 changes the submarine altitude H of the underwater moving object 1 according to the altitude change command outputted from the system controller 16.

After the navigation control unit 2 changes the submarine altitude H of the underwater moving object 1, the system controller 16 starts the next scanning (step ST2).

When not receiving any answer that the submarine altitude can be changed from the navigation control unit 2 (step ST8), the system controller 16 calculates a new beam divergence θ satisfying the equation (6).

After calculating the new beam divergence θ, the system controller 16 calculates a new beam scanning rate f (beam scanning period) satisfying the equation (5) by using the beam divergence θ, the current submarine altitude H, and the current moving speed V (step ST11).

Next, the system controller 16 checks whether or not it is possible to maintain the measurements within the prescribed permissible range of spatial resolutions when using the new beam scanning rate f (beam scanning period) (step ST12).

More specifically, the system controller 16 substitutes the new beam scanning rate f, the current pulse repetition period R, the current submarine altitude H, and the current beam scanning range X into the equation (7), to calculate a new spatial resolution N, and, when the difference between this spatial resolution N and the current spatial resolution (the amount of variation in the spatial resolution) falls within the permissible range, determines that it is possible to maintain the measurements within the prescribed permissible range of spatial resolutions.

When it is possible to maintain the measurements within the prescribed permissible range of spatial resolutions, the system controller 16 outputs abeam scanning rate command signal showing the new beam scanning rate f (beam scanning period) to the beam scanning system 24 of the transmission and reception optical unit 12, thereby setting the new beam scanning rate f, and also outputs a beam adjustment signal showing the new beam divergence θ to the beam adjustment optical system 23 of the transmission and reception optical unit 12, thereby setting the new beam divergence θ (step ST13).

After setting the new beam scanning rate f and the new beam divergence θ, the system controller 16 starts the next scanning (step ST2).

When the measurements within the prescribed permissible range of spatial resolutions cannot be maintained, the system controller 16 determines whether or not to make a setting change to the spatial resolution (step ST14).

For example, when the underwater moving object 1 is in a state in which the underwater moving object can communicate with a mother ship or a base, the system controller inquires of the user whether or not to make a setting change to the spatial resolution. When the underwater moving object is in a state in which the underwater moving object cannot communicate with a mother ship or a base, the system controller determines whether or not it is possible to make a setting change according to a process which is programmed in advance.

When it is possible make a setting change to the spatial resolution, the system controller 16 outputs a beam scanning rate command signal showing the new beam scanning rate f (beam scanning period) to the beam scanning system 24 of the transmission and reception optical unit 12, thereby setting the new beam scanning rate f, and also outputs a beam adjustment signal showing the new beam divergence θ to the beam adjustment optical system 23 of the transmission and reception optical unit 12, thereby setting the new beam divergence θ (step ST12).

After setting the new beam scanning rate f and the new beam divergence θ, the system controller 16 starts the next scanning (step ST2).

When it is impossible make a setting change to the spatial resolution, the system controller 16 displays a warning (step ST15), and starts the next scanning in a state which the current beam scanning rate f and the current beam divergence θ are maintained (step ST2).

Until the measurements on the measurement plane 3 are completed, the laser radar device 10 repeatedly performs the processes of steps ST2 to ST15.

While the image processing unit 15 generates a three-dimensional map from the plurality of three dimensional coordinates $(X_N, Y_N, Z_N)$ of the measurement points on the measurement plane 3, as mentioned above, the system controller can examine gaps among the measurement points of the three-dimensional map generated by the image processing unit 15.

At that time, the system controller 16 extracts either an area where the density of measurement points included in a prescribed volume is lower than a reference density set by the user, or an area where the gaps among the measurement points included in a prescribed volume are wider than a reference gap set by the user, and sends a notification of the area to the navigation control unit 2 of the underwater moving object 1.

When receiving the above-mentioned notification from the system controller 16, the navigation control unit 2 of the underwater moving object 1 can measure the above-mentioned area again.

As can be seen from the above description, because the laser radar device in accordance with Embodiment 1 of the present invention is configured in such a way that the system controller 16 determines whether the quality of the distance image or the light intensity image, which is generated by the image processing unit 15, satisfies the reference quality, and, when the quality of the distance image or the light intensity image does not satisfy the reference quality, outputs a speed change command to lower the speed, an altitude change command to change the submarine altitude (depth), or the like to the navigation control unit 2, thereby changing the physical relative relation between the measurement plane 3 and the device in question, or changing the beam scanning rate f, the beam divergence θ, or the like within limits at which the amount of variation in the spatial resolution does not exceed the permissible amount, there is provided an advantage of being able to prevent the occurrence of an omission in the measurement portions in the image, and ensure desired image quality.

Further, by examining the gaps among the measurement points of the three-dimensional map in real time, a portion having few measurement points can be extracted autonomously and re-measurements can be performed, non-useless underwater topographical measurements can be performed during one-time investigation.

Embodiment 2

Figure 12:
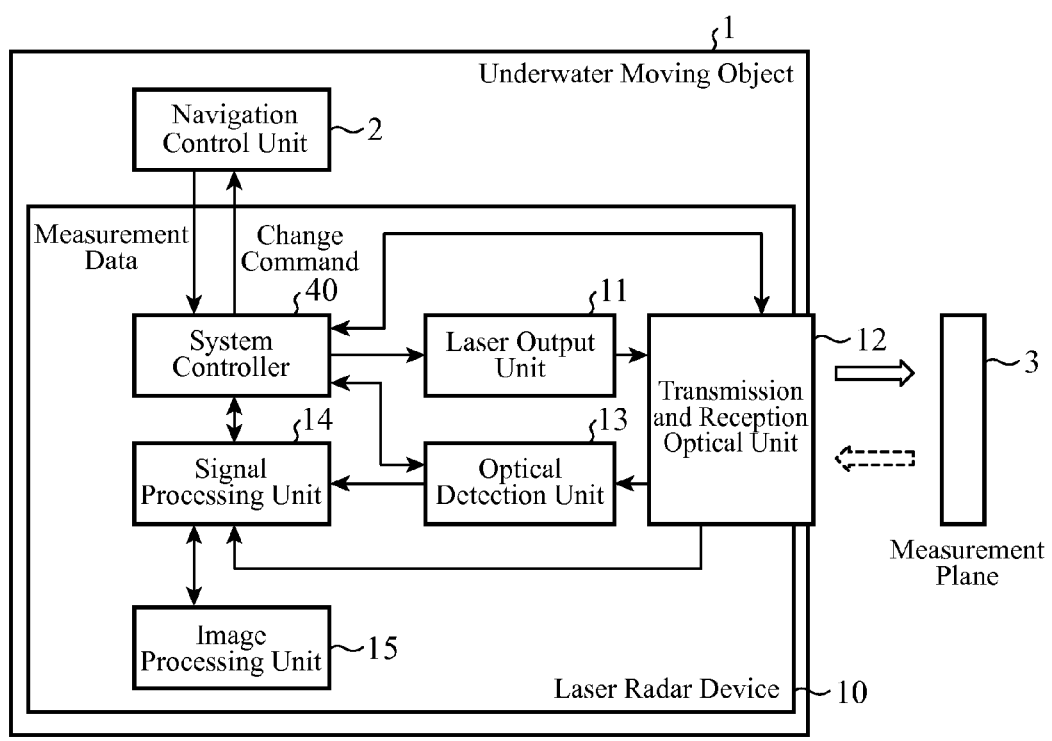
FIG. 12 is a block diagram showing a laser radar device in accordance with Embodiment 2 of the present invention.

FIG. 12 is a configuration diagram showing a laser radar device in accordance with Embodiment 2 of the present invention. In the figure, because the same reference numerals as those shown in FIG. 1 denote the same components or like components, the explanation of the components will be omitted hereafter.

A system controller 40 consists of, for example, either a semiconductor integrated circuit equipped with a CPU, or a one chip microcomputer, and, in addition to performing the same process as that performed by the system controller 16 of FIG. 1, performs a process of counting the number of pixels each having a significant pixel value within a distance image generated by an image processing unit 15, and determining that the quality of the distance image does not satisfy reference quality when the number is smaller than a prescribed number (first reference number).

The system controller 40 also performs a process of counting the number of pixels each having a saturation value within the pixels which construct a light intensity image generated by the image processing unit 15, and determining that the quality of the light intensity image does not satisfy reference quality when the number of pixels each having the saturation value is equal to or larger than a permissible number (second reference number).

When determining that the quality of the distance image does not satisfy the reference quality, the system controller 40 performs a process of commanding a navigation control unit 2 of an underwater moving object 1 to move closer to the measurement object, thereby changing the physical relative relation between the measurement object and the device in question.

Further, when determining that the quality of the light intensity image does not satisfy the reference quality, the system controller 40 performs a process of changing a transmission and reception condition for laser light (e.g., the laser power of pulse laser light outputted from a laser output unit 1, the receiving field of view in a reception optical system 26 of a transmission and reception optical unit 12, the light receiving gain and the gate time of an optical detection unit 2, the received signal threshold in a threshold adjusting unit 31 of a signal processing unit 14, or the like).

The system controller 40 constructs a quality determinator, a relative relation changer, and a low measurement point density area extractor.

Although it is assumed in the example shown in FIG. 12 that the laser output unit 11, the transmission and reception optical unit 12, an optical detection unit 13, the signal processing unit 14, the image processing unit 15, and the system controller 40, which are the components of the laser radar device, consist of pieces of hardware for exclusive use, respectively, all or a part of the laser radar device can alternatively consist of a computer.

For example, in a case in which a part of the laser radar device (e.g., the signal processing unit 14, the image processing unit 15, and the system controller 40) consists of a computer, a program in which the details of processing performed by the signal processing unit 14, the image processing unit 15, and the system controller 40 are described can be stored in a memory of the computer, and a CPU of the computer can be made to execute the program stored in the memory.

Figure 13:
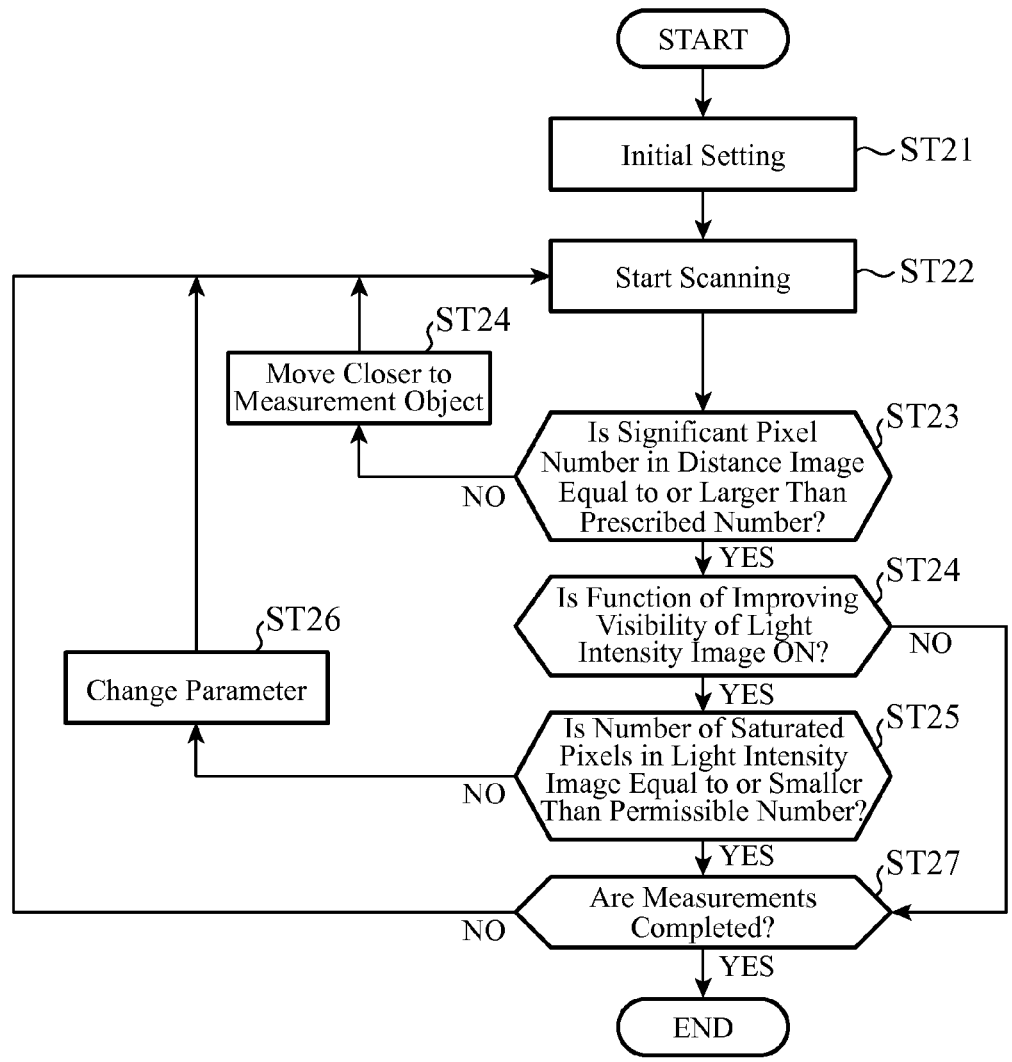
FIG. 13 is a flow chart showing the details of processing (radar image generating method) performed by the laser radar device in accordance with Embodiment 2 of the present invention.

FIG. 13 is a flow chart showing the details of processing (radar image generating method) performed by the laser radar device in accordance with Embodiment 2 of the present invention.

Next, operations will be explained.

Figure 14:
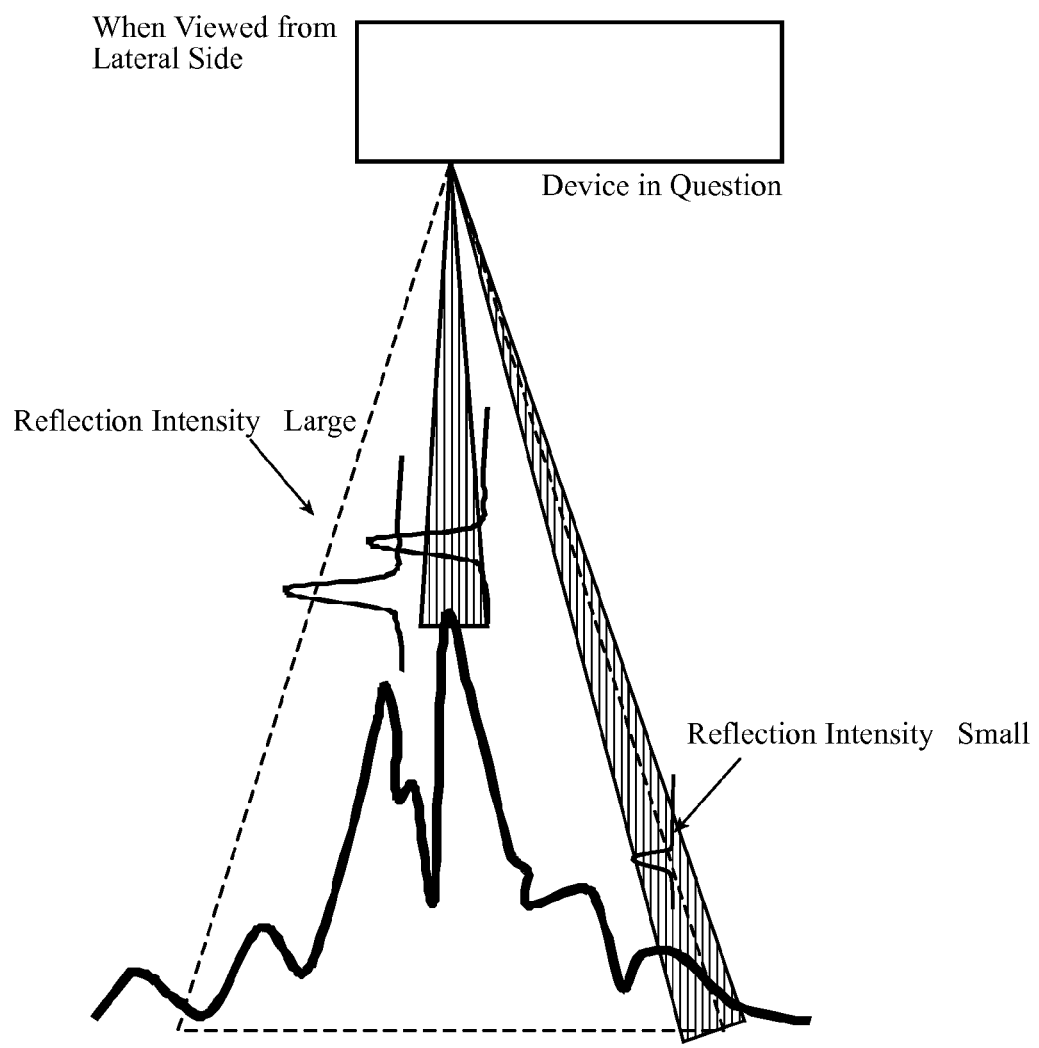
FIG. 14 is a conceptual diagram showing an operation of imaging an underwater object (measurement object) which is performed by the laser radar device.

FIG. 14 is a conceptual diagram showing an operation of imaging an underwater object (measurement object) which is performed by the laser radar device.

In this Embodiment 2, it is assumed that a beam scanning system 24 of the transmission and reception optical unit 12 performs two-dimensional scanning both in a horizontal direction and in a vertical direction under control by the system controller 40.

The imaging operation shown in FIG. 14 is a one in a case in which the underwater moving object 1 in which the laser radar device 10 is mounted performs a shape measurement on a specific measurement object while moving closer to the specific measurement object.

In this case, the underwater moving object 1 starts the operation of the laser radar device 10 from a state in which the underwater moving object 1 is located at a position where an optical camera or the like mounted in the underwater moving object 1 cannot recognize the distance to the measurement object, but a distance sensor mounted in the underwater moving object 1, such as a sonic sensor, can grasp the distance to the measurement object roughly.

More specifically, when the underwater moving object 1 detects that the underwater moving object has moved close to the measurement object up to a distance at which the laser radar device 10 is enabled to operate, by using the distance sensor mounted therein, such as a sonic sensor, the laser radar device 10 starts initial settings.

Concretely, the laser radar device starts initial settings in the following way.

The system controller 40 of the laser radar device 10 initializes each of the processing units before starting measurements on the measurement object (step ST21 of FIG. 13).

More specifically, while the system controller 40 initializes each of the processing units, like the system controller 16 of FIG. 1, the system controller 40 initializes the laser power of the pulse laser light outputted from the laser output unit 1 to maximum power.

The system controller also initializes the light receiving gain of the optical detection unit 2 to a maximum and initializes the received signal threshold in the threshold adjusting unit 31 of the signal processing unit 14 to a minimum.

After completing the initial setting of each of the processing units, the system controller 40 outputs a command to output pulse laser light to the laser output unit 11, thereby starting two-dimensional scanning on the measurement object (step ST22).

When receiving the command to output pulse laser light from the system controller 40, the laser output unit 11 repeatedly outputs pulse laser light to the transmission and reception optical unit 12 at pulse repetition periods of R which is initially set, like that in accordance with above-mentioned Embodiment 1.

When the laser output unit 11 starts outputting the pulse laser light, the system controller 40 outputs a pulse output synchronization signal to a distance and three dimensional coordinate calculator 34 of the signal processing unit 14 in synchronization with the output of the pulse laser light in the laser output unit 11, like the system controller 16 shown in FIG. 1.

Every time when pulse laser light (transmission light) is outputted from the laser output unit 11, a laser light brancher 21 of the transmission and reception optical unit 12 splits the pulse laser light (transmission light) into pulse laser light beams, and outputs one of the pulse laser light beams to a beam adjustment optical system 23 and outputs the other one of the pulse laser light beams to a transmission light monitor unit 22, like that in accordance with above-mentioned Embodiment 1.

When receiving the pulse laser light from the laser light brancher 21, the transmission light monitor unit 22 converts the pulse laser light into an electric signal and outputs the electric signal to an elapsed time measuring unit 32 and a light intensity detecting unit 33 of the signal processing unit 14 as a laser light output timing monitor signal, like that in accordance with above-mentioned Embodiment 1.

When receiving the pulse laser light from the laser light brancher 21, the beam adjustment optical system 23 of the transmission and reception optical unit 12 adjusts the beam diameter and the beam divergence θ of the pulse laser light according to a beam adjustment signal which is outputted from the system controller 40 at the initial setting time, and outputs the pulse laser light after adjustment to a beam scanning system 24.

When receiving the pulse laser light after adjustment from the beam adjustment optical system 23, a transmission optical system 25 of the beam scanning system 24 radiates the pulse laser light (transmission light) toward the measurement object, like that in accordance with above-mentioned Embodiment 1.

At that time, every time the beam scanning system 24 receives the pulse laser light after adjustment from the beam adjustment optical system 23, the beam scanning system 24 changes the beam scanning angle θ of the pulse laser light radiated from the transmission optical system 25 at the beam scanning rate f (beam scanning period) shown by abeam scanning rate command signal which is outputted from the system controller 40 at the initial setting time.

Further, when receiving the pulse laser light after adjustment from the beam adjustment optical system 23 for the first time, the beam scanning system 24 outputs a beam scanning start signal showing a start timing of the beam scanning to the signal processing unit 14.

In the reception optical system 26 of the transmission and reception optical unit 12, the receiving field of view is adjusted according to a receiving field of view adjustment signal outputted from the system controller 40. The reception optical system focuses the pulse laser light (received light) which is reflected by the measurement object and returns thereto after being radiated from the transmission optical system 25 onto the optical detection unit 13.

The optical detection unit 13 converts the pulse laser light focused by the reception optical system 26 of the transmission and reception optical unit 12 into an electric signal with the light receiving gain which is initially set by the system controller 40, and outputs the received signal which is the electric signal to the signal processing unit 14.

When receiving the received signal from the optical detection unit 13, the signal processing unit 14 performs various signal processes on the received signal, like that in accordance with above-mentioned Embodiment 1.

The image processing unit 15 displays either a two-dimensional distance image and a two-dimensional intensity image or a three-dimensional map in response to an external request.

After that, the system controller 40 performs a process of improving the visibility of a captured image of the measurement object.

Figure 15:
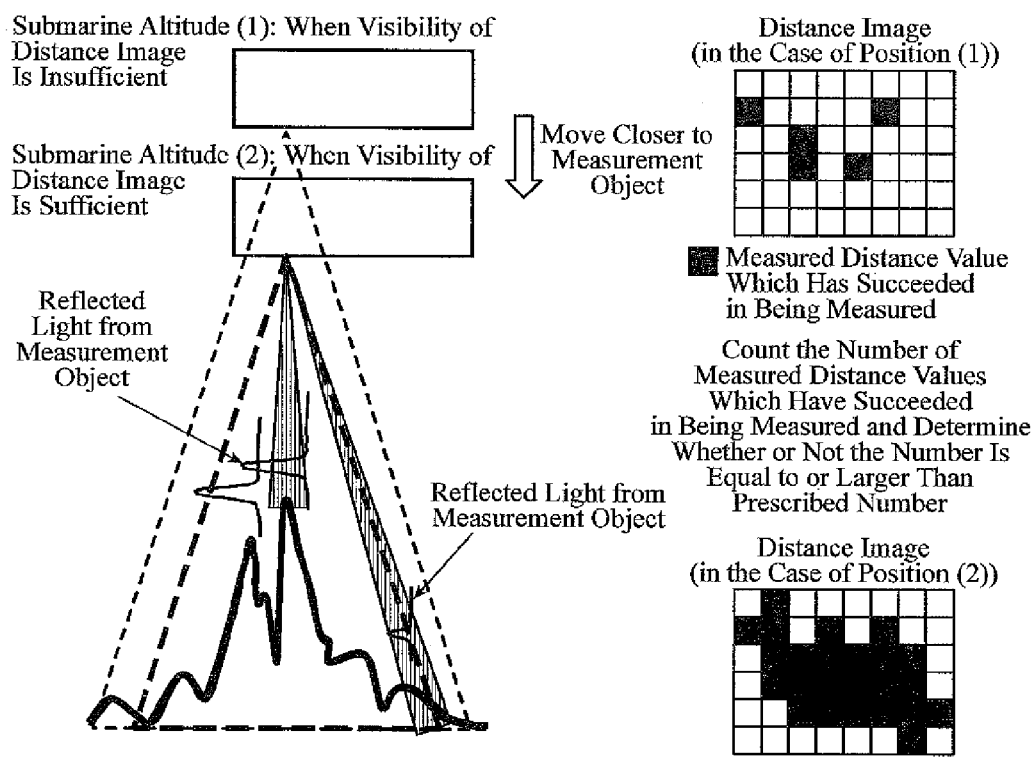
FIG. 15 is an explanatory drawing showing a state in which, in order to improve the visibility of a measurement object in a distance image, the laser radar device 10 controls an approach to the measurement object while autonomously performing determination.

FIG. 15 is an explanatory drawing showing a state in which, in order to improve the visibility of the measurement object in the distance image, the laser radar device 10 controls an approach to the measurement object while autonomously performing determination.

In FIG. 15, a control method for improving the visibility of the distance image when the exact distance to the measurement object and the light attenuation characteristics of the underwater environment are unknown is shown. FIG. 15 shows an example in which measured distance values which have succeeded in being measured exist sparsely under circumstances where the laser radar device is at a distance to the measurement object to such an extent that no signal having adequate reflection intensity can be received.

Figure 16:
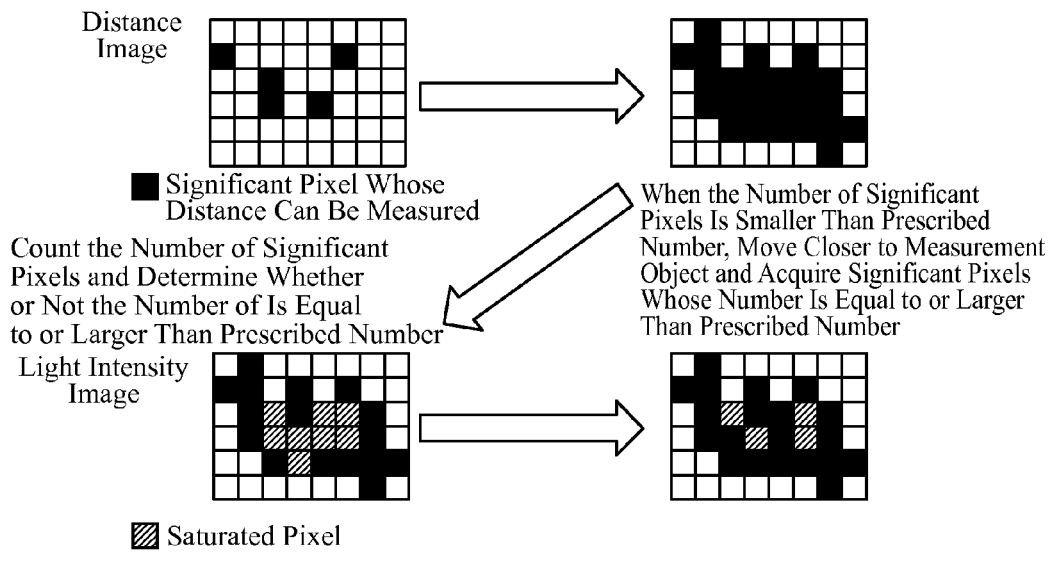
FIG. 16 is an explanatory drawing showing a change of the visibility of the measurement object in a distance image and in a light intensity image.

FIG. 16 is an explanatory drawing showing a change of the visibility of the measurement object in the distance image and in the light intensity image.

Every time when the image processing unit 15 generates a distance image for each captured frame, the system controller 40 counts the number $C_1$ of pixels each having a significant pixel value (referred to as the "significant pixel number" from here on) in the distance image.

After counting the significant pixel number $C_1$ in the distance image, the system controller 40 compares the significant pixel number $C_1$ with a prescribed number $C_{ref1}$ (this prescribed number is a reference number which is preset by the user or the system) (step ST23).

When the significant pixel number $C_1$ is smaller than the prescribed number $C_{ref1}$, the system controller 40 determines that the quality of the distance image does not satisfy the reference quality, and commands the navigation control unit 2 of the underwater moving object 1 to move closer to the measurement object.

When receiving the command to move closer to the measurement object from the system controller 40, the navigation control unit 2 moves the underwater moving object 1 in such a way that the underwater moving object 1 moves closer to the measurement object (step ST24).

As a result, the measurement object is measured in a state in which the underwater moving object is closer to the measurement object than it was at the time of the previous measurement and a distance image and a light intensity image are generated (step ST22), and it is therefore expected that the visibility of the measurement object in the distance image is improved.

When the significant pixel number $C_1$ in the distance image is equal to or larger than the prescribed number $C_{ref1}$ the system controller 40 determines that the quality of the distance image satisfies the reference quality, and, when the function of improving the visibility of the measurement object in the light intensity image is set to ON (step ST24), counts the number $C_2$ of pixels each having a saturation value (referred to as the "number of saturated pixels" from here on) in the pixels which construct the light intensity image generated by the image processing unit 15.

After counting the number $C_2$ of saturated pixels in the light intensity image, the system controller 40 compares the number $C_2$ of saturated pixels with the permissible number $C_{ref2}$ (this permissible number is a reference number which is preset by the user or the system) (step ST25).

When the number $C_2$ of saturated pixels is equal to or larger than the permissible number $C_{ref2}$, the system controller 40 determines that the quality of the light intensity image does not satisfy the reference quality, and changes a parameter of the laser radar device 10 (a transmission and reception condition for laser light) (step ST26).

For example, the system controller performs a changing process of lowering the laser power of the pulse laser light outputted from the laser output unit 1, a changing process of lowering the light receiving gain of the optical detection unit 2, or a changing process of raising the received signal threshold in the threshold adjusting unit 31 of the signal processing unit 14.

As an alternative, the system controller performs a changing process of narrowing the receiving field of view in the reception optical system 26 of the transmission and reception optical unit 12. When performing the changing process of raising the received signal threshold, the system controller also raises the threshold of the transmission light monitor unit 22 similarly in order to prevent degradation in the distance accuracy which is caused due to a system error.

As a result, the measurement object is measured with a parameter (transmission and reception condition for laser light) different from the previous parameter, and a distance image and a light intensity image are generated (step ST22), and it is therefore expected that the visibility of the measurement object in the light intensity image is improved.

After that, the processes of steps ST22 to ST26 are repeated until the quality of the distance image or the light intensity image satisfies the reference quality, the series of processes are ended after the measurements are completed (step ST27).

Because the saturation in the light intensity image may be improved by increasing the distance between the underwater moving object 1 and the measurement object when the quality of the distance image or the light intensity image does not satisfy the reference quality even if the processes of steps ST22 to ST26 are repeated, the system controller 40 may output a command to increase the distance between the underwater moving object 1 and the measurement object to the navigation control unit 2.

As can be seen from the above description, the laser radar device in accordance with this Embodiment 2 is constructed in such a way that when the significant pixel number $C_1$ in the distance image generated by the image processing unit 15 is smaller than the prescribed number $C_{ref1}$, the system controller 40 commands the navigation control unit 2 of the underwater moving object 1 to move closer to the measurement object, and, when the number $C_2$ of saturated pixels in the light intensity image generated by the image processing unit 15 is equal to or larger than the permissible number $C_{ref2}$, changes a parameter (transmission and reception condition for laser light) of the laser radar device 10, there is provided an advantage of being able to prevent decrease in the significant pixel number $C_1$ in the distance image and increase in the number $C_2$ of saturated pixels in the light intensity image, thereby ensuring desired image quality.

Therefore, time and effort required to perform a parameter adjustment by remote control are saved, and the measurement time can be shortened. Further, by autonomously adjusting the distance between the underwater moving object 1 and the measurement object, it becomes possible to provide a captured image having good visibility without having to grasp the characteristics of the underwater environment even when the underwater environment changes. In addition, the energy consumption per each measurement performed by the underwater moving object 1 can be reduced, and there is provided an advantage of improving the operation efficiency of the laser radar device and enlarging the search range of the laser radar device.

Embodiment 3

Figure 17:
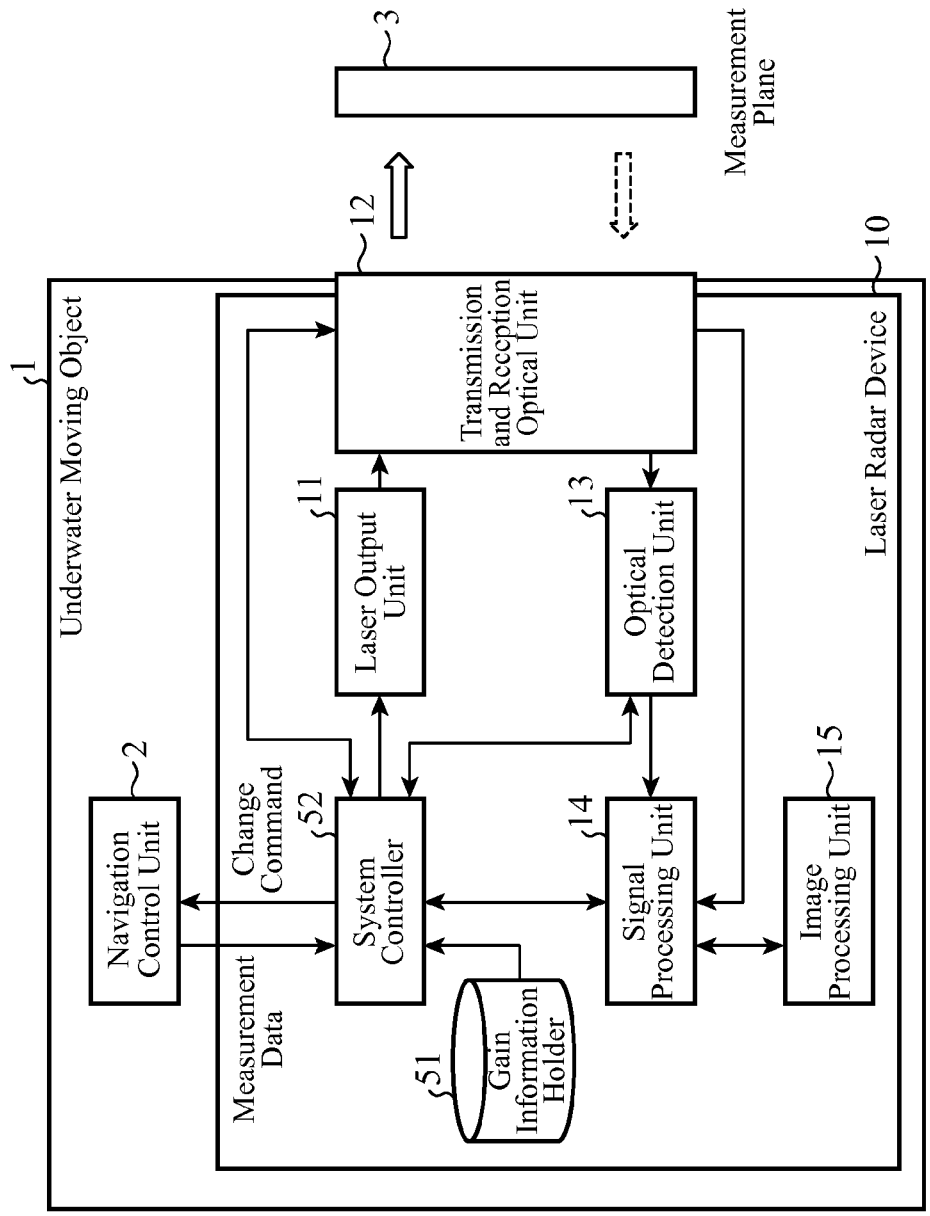
FIG. 17 is a block diagram showing a laser radar device in accordance with Embodiment 3 of the present invention.

FIG. 17 is a block diagram showing a laser radar device in accordance with Embodiment 3 of the present invention. In the figure, the same reference numerals as shown in FIGS. 1 and 12 denote the same components or like components, and therefore the explanation of the components will be omitted hereafter.

A gain information holder 51 consists of, for example, a storage, such as a RAM or a hard disk, and holds a plurality of types of gain curves (gain information) each showing a correspondence between the elapsed time that elapses from the time when a laser light output timing monitor signal is outputted from a transmission light monitor unit 22 (the time when laser light starts being radiated), and a time response gain (gain). The gain information holder 51 constructs a gain information holder.

A system controller 52 consists of, for example, either a semiconductor integrated circuit equipped with a CPU, or a one chip microcomputer, and, in addition to performing the same process as that performed by the system controller 16 of FIG. 1 or the system controller 40 of FIG. 12, performs a process of counting the significant pixel number $C_1$ in a distance image generated by an image processing unit 15, and selecting a gain curve which makes the significant pixel number $C_1$ be equal to or larger than a prescribed number $C_{ref1}$ from among the plurality of gain curves held by the gain information holder 51.

The system controller 52 also performs a process of counting the number $C_2$ of saturated pixels in a light intensity image generated by the image processing unit 15, and changing a transmission and reception condition for laser light (e.g., the laser power of pulse laser light, a light receiving gain, a received signal threshold, or the like), which is a parameter of the laser radar device 10, in such a way that the number $C_2$ of saturated pixels is equal to or smaller than a permissible number $C_{ref2}$.

The system controller 52 constructs a quality determinator, a relative relation changer, a low measurement point density area extractor, and a gain information selector.

Although it is assumed in the example shown in FIG. 17 that a laser output unit 11, a transmission and reception optical unit 12, an optical detection unit 13, a signal processing unit 14, an image processing unit 15, the gain information holder 51, and the system controller 52, which are the components of the laser radar device, consist of pieces of hardware for exclusive use, respectively, all or a part of the laser radar device can alternatively consist of a computer.

For example, in a case in which a part of the laser radar device (e.g., the signal processing unit 14, the image processing unit 15, the gain information holder 51, and the system controller 52) consists of a computer, while the gain information holder 51 is configured in a memory of the computer, a program in which the details of processing performed by the signal processing unit 14, the image processing unit 15, and the system controller 52 are described can be stored in a memory of the computer, and a CPU of the computer can be made to execute the program stored in the memory.

Figure 19:
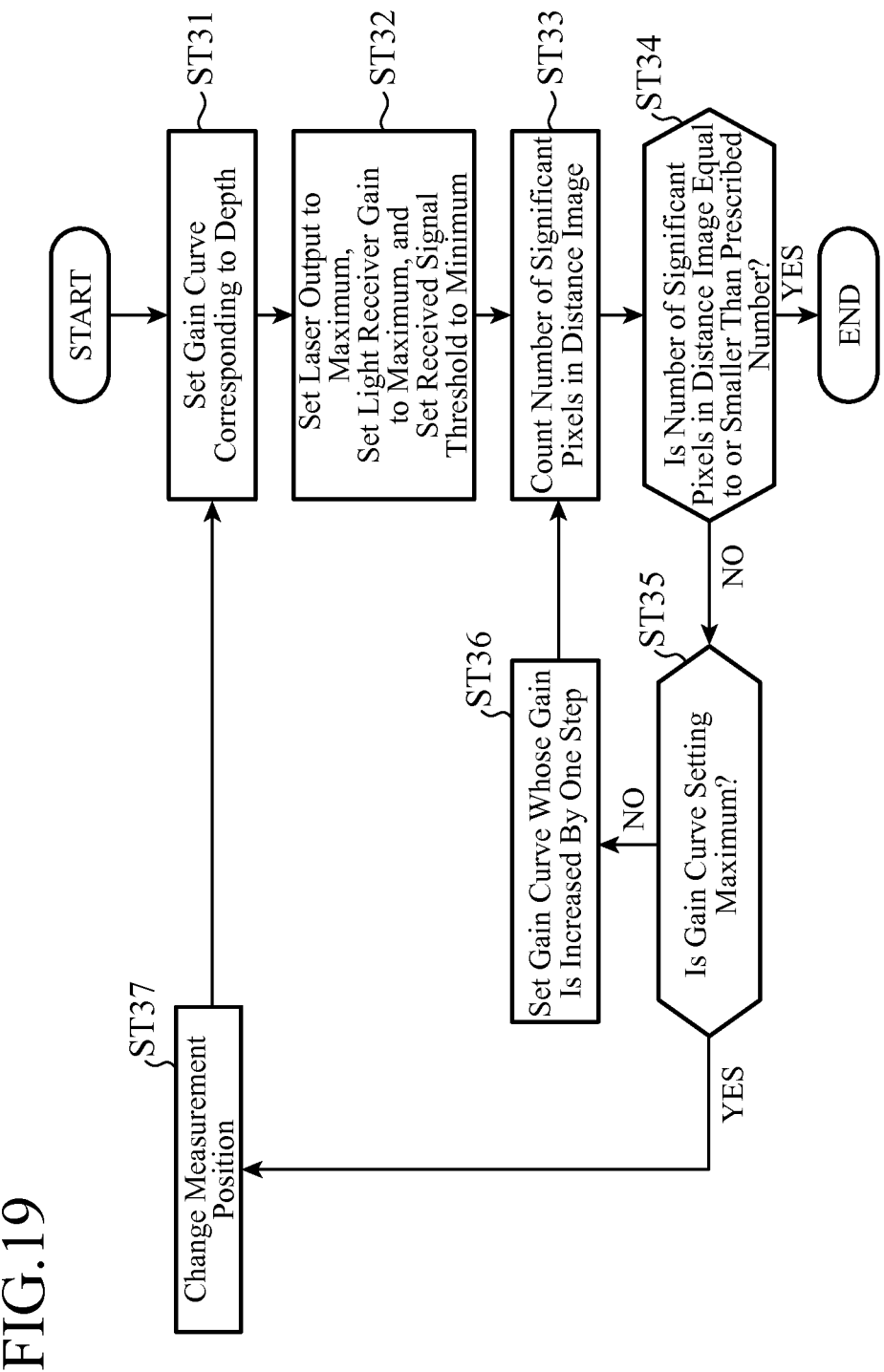
FIG. 19 is a flow chart showing the details of processing (radar image generating method) performed by the laser radar device in accordance with Embodiment 3 of the present invention.
Figure 20:
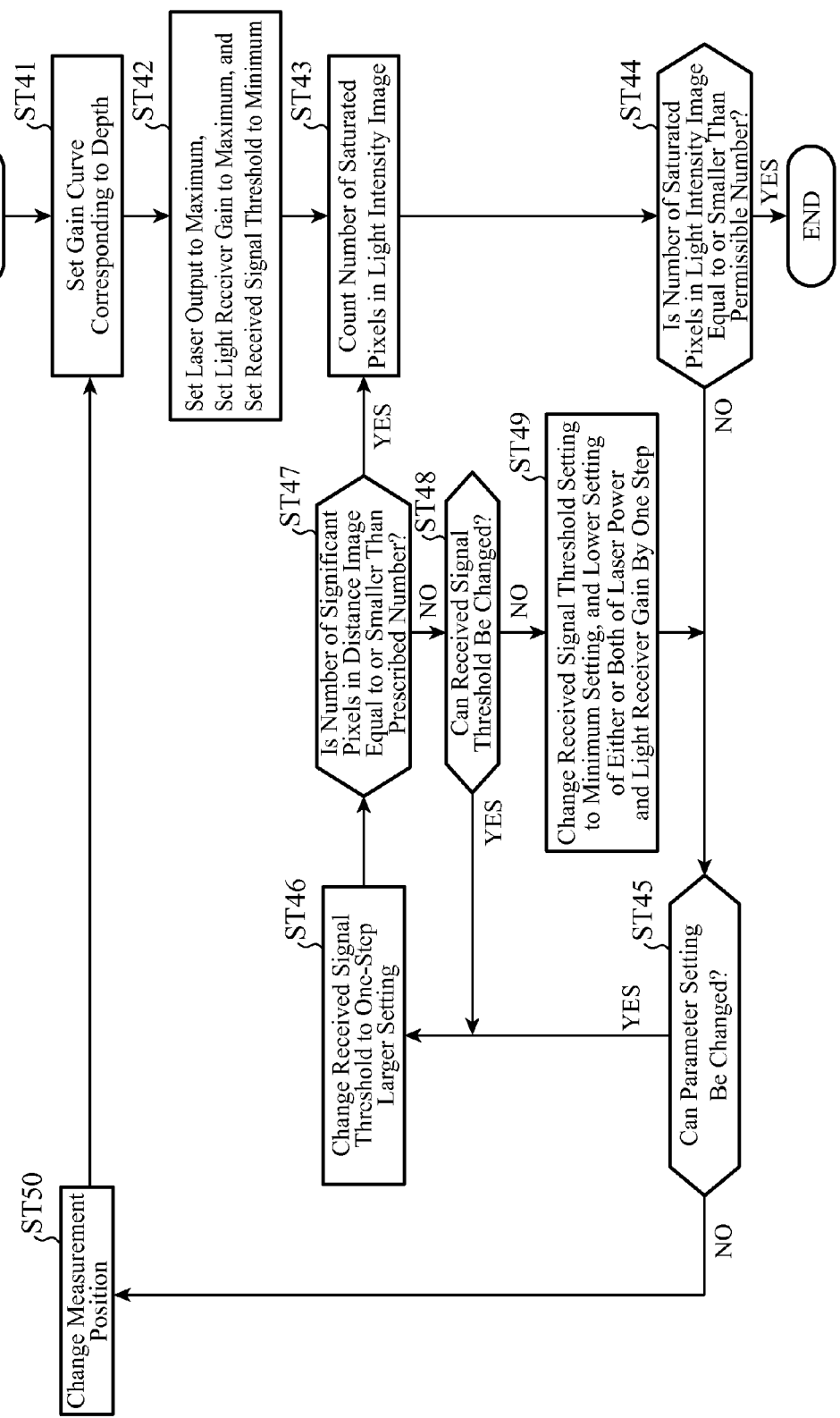
FIG. 20 is a flow chart showing the details of processing (radar image generating method) performed by the laser radar device in accordance with Embodiment 3 of the present invention.

FIGS. 19 and 20 are flow charts showing the details of processing (radar image generating method) performed by the laser radar device in accordance with Embodiment 3 of the present invention.

Figure 18:
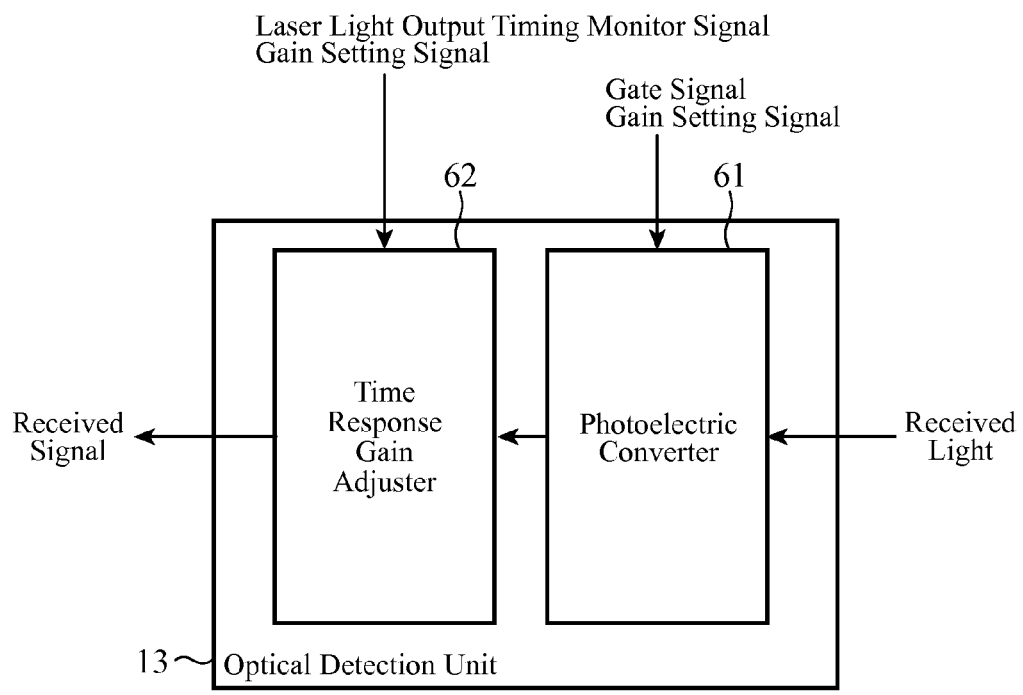
FIG. 18 is a block diagram showing an optical detection unit 13 of the laser radar device in accordance with Embodiment 3 of the present invention.

FIG. 18 is a configuration diagram showing the optical detection unit 13 of the laser radar device in accordance with Embodiment 3 of the present invention.

Referring to FIG. 18, when a gate signal (signal which is outputted after the lapse of a delay time set by the user since a laser light output timing monitor signal has been outputted from the transmission light monitor unit 22) is outputted from the system controller 52, a photoelectric converter 61 performs a process of applying the light receiving gain shown by a gain setting signal outputted from the system controller 52 to the pulse laser light focused by a reception optical system 26 of the transmission and reception optical unit 12, converting the pulse laser light to which the light receiving gain is applied into an electric signal, and outputting the received signal which is the electric signal.

A time response gain adjuster 62 performs a process of referring to the gain curve selected by the system controller 52 to determine the time response gain (gain) corresponding to the elapsed time that elapses from the time when the laser light starts being radiated, applying the time response gain to the received signal outputted from the photoelectric converter 61, and outputting the received signal to which the time response gain is applied to the signal processing unit 14.

A light receiver is configured with the photoelectric converter 61 and the time response gain adjuster 52.

Next, operations will be explained.

In this Embodiment 3, only the details of processing different from that shown in any of above-mentioned Embodiments 1 and 2 will be explained, and the explanation of the details of the same processing as that shown in any of above-mentioned Embodiments 1 and 2 will be omitted hereafter.

First, the details of processing at the time of improving the quality of a distance image will be explained.

The system controller 52 acquires measurement data showing the submarine altitude (depth) at which the underwater moving object 1 exists currently from the navigation control unit 2 of the underwater moving object 1.

Next, the system controller 52 refers to a reference table (not shown) showing a correspondence between the submarine altitude (depth) and a gain curve, selects the gain curve corresponding to the submarine altitude (depth) at which the underwater moving object 1 exists currently from among the plurality of types of gain curves held by the gain information holder 51, and sets the gain curve to the time response gain adjuster 62 of the optical detection unit 13 (step ST31 of FIG. 19).

The system controller 52 also initializes the laser power of the pulse laser light outputted from the laser output unit 1 to maximum power, and further initializes the light receiving gain of the optical detection unit 2 to a maximum. The system controller further initializes the received signal threshold in the threshold adjusting unit 31 of the signal processing unit 14 to a minimum (step ST32).

After the lapse of the delay time which is preset by the user since the laser light output timing monitor signal has been outputted from the transmission light monitor unit 22, the system controller 52 outputs the gate signal to the photoelectric converter 61 of the optical detection unit 13.

The system controller 52 outputs the gate signal in order to avoid light-receiving of scattered light within the system and light-receiving of unnecessary scattered light from a short distance.

When the gate signal is outputted from the system controller 52, the photoelectric converter 61 of the optical detection unit 13 applies the light receiving gain shown by the gain setting signal outputted from the system controller 52 (the maximum at the initial setting time) to the pulse laser light focused by the reception optical system 26 of the transmission and reception optical unit 12, converts the pulse laser light to which the light receiving gain is applied into an electric signal, and outputs the received signal which is the electric signal to the time response gain adjuster 62.

The time response gain adjuster 62 of the optical detection unit 13 refers to the gain curve set by the system controller 52 to determine the time response gain (gain) corresponding to the elapsed time that elapses from the time when the laser light output timing monitor signal is outputted (the time when the laser light starts being radiated), applies the time response gain to the received signal outputted from the photoelectric converter 61, and outputs the received signal to which the time response gain is applied to the signal processing unit 14.

Figure 21:
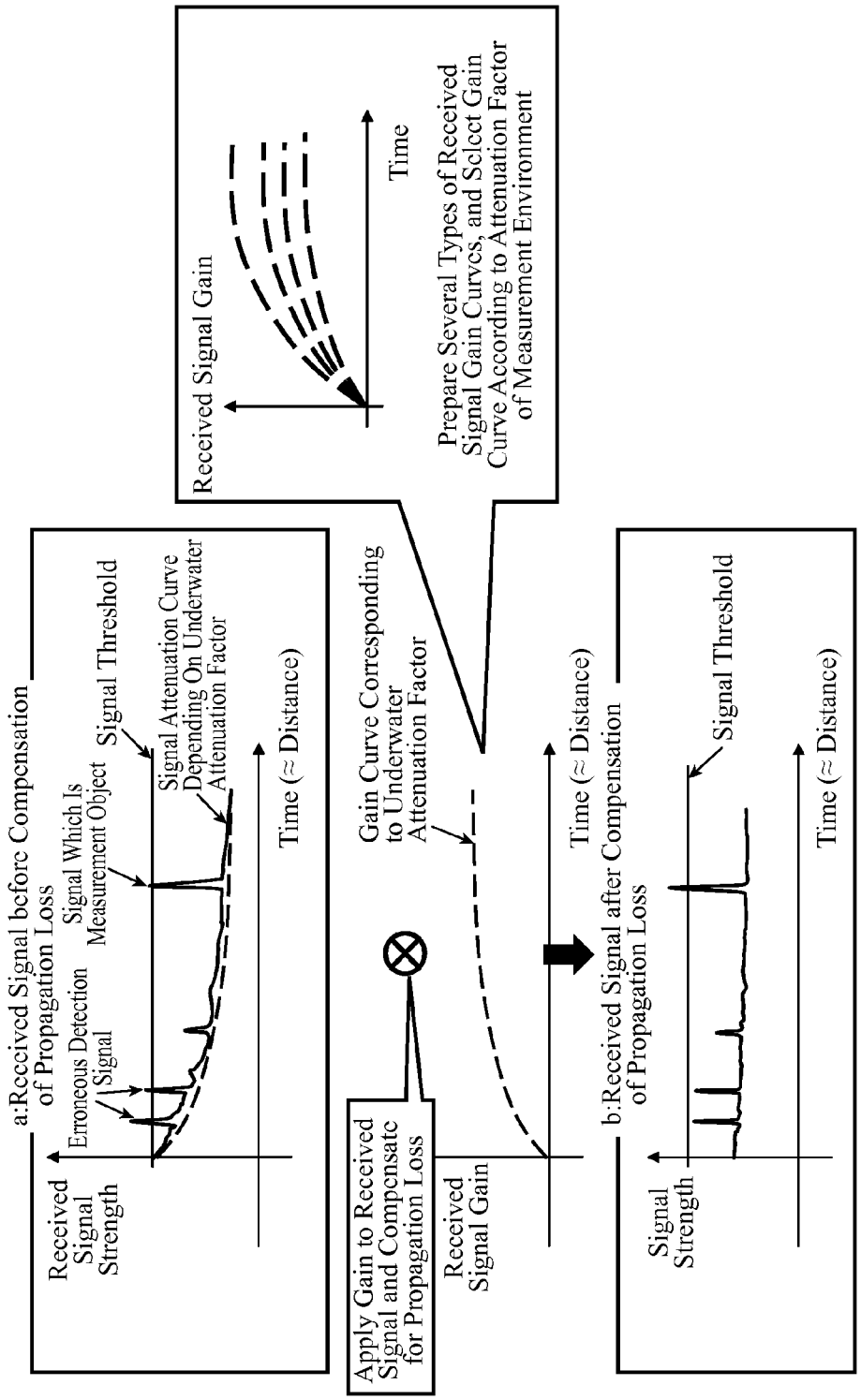
FIG. 21 is an explanatory drawing showing propagation loss compensation performed by a time response gain adjuster 62.

FIG. 21 is an explanatory drawing showing propagation loss compensation provided by the time response gain adjuster 62.

A plurality of types of gain curves are prepared in the gain information holder 51 on the assumption that the propagation space has a light attenuation factor, and the time response gain in each of the gain curves is set in such a way as to substantially become large with time.

The time response gain adjuster 62 applies the time response gain corresponding to the elapsed time to the received signal, thereby compensating for the attenuation caused by the propagation of the laser light. As a result, it becomes possible to reduce erroneous detection of scattered light from a floating matter or the like at a relatively short distance, which cannot be reduced even if the signal threshold adjustment is performed.

The received signal outputted from the time response gain adjuster 62 of the optical detection unit 13 is received by the signal processing unit 14, so that the same processing as that shown in any of above-mentioned Embodiments 1 and 2 is performed.

After the image processing unit 15 generates a distance image, the system controller 52 counts the significant pixel number $C_1$ in the distance image, like the system controller 40 of FIG. 12 (step ST33).

After counting the significant pixel number $C_1$ in the distance image, the system controller 52 compares the significant pixel number $C_1$ with a prescribed number $C_{refl}$ (this prescribed number $C_{refl}$ is a reference number preset by the user or the system, and can be the same as or different from the prescribed number $C_{refl}$ shown in above-mentioned Embodiment 2) (step ST34).

When the significant pixel number $C_1$ in the distance image is equal to or larger than the prescribed number $C_{refl}$, the system controller 52 determines that the quality of the distance image satisfies reference quality, maintains the gain curve which is previously set to the time response gain adjuster 62, and continues the measurements while keeping the current parameters.

When the significant pixel number $C_1$ in the distance image is smaller than the prescribed number $C_{refl}$, the system controller 52 determines that the quality of the distance image does not satisfy the reference quality and checks whether or not it is possible to raise the setting of the gain curve by one step.

More specifically, the system controller 52 determines whether there exists, in the plurality of types of gain curves held by the gain information holder 51, a gain curve having a larger time response gain (gain) corresponding to the elapsed time than that of the gain curve which is previously set to the time response gain adjuster 62 (step ST35).

When it is possible to raise the setting of the gain curve by one step, the system controller 52 selects a gain curve having a time response gain (gain) which is larger, by one step, than that of the gain curve which is previously set to the time response gain adjuster 62 from among the plurality of types of gain curves held by the gain information holder 51, and sets the gain curve to the time response gain adjuster 62 (step ST36).

After the system controller 52 makes a setting change to the gain curve, the time response gain adjuster 62 of the optical detection unit 13 refers to the gain curve to which a setting change has been made, to determine the time response gain (gain) corresponding to the elapsed time that elapses from the time when the laser light starts being radiated, applies the time response gain to the received signal outputted from the photoelectric converter 61, and outputs the received signal to which the time response gain is applied to the signal processing unit 14.

When it is impossible to raise the setting of the gain curve by one step, the system controller 52 makes a request of the navigation control unit 2 to change the measurement position.

When receiving the request to change the measurement position from the system controller 52, the navigation control unit 2 moves the underwater moving object 1 to change the measurement position (step ST37).

After that, the processes of steps ST31 to ST37 are repeatedly carried out until the measurements are completed.

Next, the details of processing at the time of improving the quality of a light intensity image will be explained.

The system controller 52 acquires measurement data showing the submarine altitude (depth) at which the underwater moving object 1 exists currently from the navigation control unit 2 of the underwater moving object 1.

The system controller 52 then refers to the reference table (not shown) showing the correspondence between the submarine altitude (depth) and the gain curve, selects the gain curve corresponding to the submarine altitude (depth) at which the underwater moving object 1 exists currently from among the plurality of types of gain curves held by the gain information holder 51, and sets the gain curve to the time response gain adjuster 62 of the optical detection unit 13 (step ST41 of FIG. 20).

The system controller 52 also initializes the laser power of the pulse laser light outputted from the laser output unit 1 to maximum power, and further initializes the light receiving gain of the optical detection unit 2 to a maximum. The system controller further initializes the received signal threshold in the threshold adjusting unit 31 of the signal processing unit 14 to a minimum (step ST42).

After the lapse of the delay time which is preset by the user since the laser light output timing monitor signal has been outputted from the transmission light monitor unit 22, the system controller 52 outputs the gate signal to the photoelectric converter 61 of the optical detection unit 13.

When the gate signal is outputted from the system controller 52, the photoelectric converter 61 of the optical detection unit 13 applies the light receiving gain shown by the gain setting signal outputted from the system controller 52 (the maximum at the time of an initial setting) to the pulse laser light focused by the reception optical system 26 of the transmission and reception optical unit 12, converts the pulse laser light to which the light receiving gain is applied into an electric signal, and outputs the received signal which is the electric signal to the time response gain adjuster 62.

The time response gain adjuster 62 of the optical detection unit 13 refers to the gain curve set by the system controller 52 to determine the time response gain (gain) corresponding to the elapsed time that elapses from the time when the laser light output timing monitor signal is outputted (the time when the laser light starts being radiated), applies the time response gain to the received signal outputted from the photoelectric converter 61, and outputs the received signal to which the time response gain is applied to the signal processing unit 14.

The received signal outputted from the time response gain adjuster 62 of the optical detection unit 13 is received by the signal processing unit 14, so that the same processing as that shown in any of above-mentioned Embodiments 1 and 2 is performed.

After the image processing unit 15 generates a light intensity image, the system controller 52 counts the number $C_2$ of saturated pixels in the light intensity image, like the system controller 40 of FIG. 12 (step ST43).

After counting the number $C_2$ of saturated pixels in the light intensity image, the system controller 52 compares the number $C_2$ of saturated pixels with the permissible number $C_{ref2}$ (this permissible number $C_{ref2}$ is a reference number preset by the user or the system, and can be the same as or different from the permissible number $C_{ref2}$ shown in above-mentioned Embodiment 2) (step ST44).

When the number $C_2$ of saturated pixels in the light intensity image is smaller than the permissible number $C_{ref2}$, the system controller 52 determines that the quality of the light intensity image satisfies the reference quality, continues the measurements while keeping the current parameters.

When the number $C_2$ of saturated pixels in the light intensity image is equal to or larger than the permissible numbers $C_{ref2}$, the system controller 52 determines that the quality of the light intensity image does not satisfy the reference quality, and checks whether or not it is possible to change a transmission and reception condition for laser light which is a parameter of the laser radar device 10 (e.g., the laser power of the pulse laser light, the light receiving gain, the received signal threshold, or the like) (step ST45).

When it is possible to change a parameter, the system controller 52 makes a setting change to the received signal threshold in the threshold adjusting unit 31 of the signal processing unit 14 to set the threshold to a one-step larger value (step ST46).

As a result, the saturation phenomenon of the intensity information due to scattered light from a nearby floating matter can be reduced.

After making a setting change to the received signal threshold to set the threshold to a one-step larger value, the system controller 52 determines whether or not the significant pixel number $C_1$ in the distance image is equal to or larger than the prescribed number $C_{ref1}$ (step ST47).

When the significant pixel number $C_1$ in the distance image is equal to or larger than the prescribed number $C_{ref1}$, the system controller 52 determines that a reflected wave from the measurement plane 3 is receivable, and counts the number $C_2$ of saturated pixels in the light intensity image again (step ST43).

When the significant pixel number $C_1$ in the distance image is smaller than the prescribed number $C_{ref1}$, the system controller 52 determines that a reflected wave from the measurement plane 3 is not receivable, and checks whether or not it is possible to change the received signal threshold to a one-step larger value (step ST48).

When it is possible to change the received signal threshold to a one-step larger value, the system controller 52 further makes a setting change to the received signal threshold in the threshold adjusting unit 31 of the signal processing unit 14 to a one-step larger value (step ST46).

When it is possible to change the received signal threshold to a one-step larger value, the system controller 52 changes the setting of the received signal threshold in the threshold adjusting unit 31 to a minimum, and also changes the setting of at least one of the laser power of the pulse laser light outputted from the laser output unit 1 and the light receiving gain of the optical detection unit 2 to a one-step smaller value (step ST49).

After that, the system controller checks whether or not the significant pixel number $C_1$ in the distance image is equal to or larger than the prescribed number $C_{ref1}$, like in the above-mentioned case.

When it is impossible to change any parameter (step ST45), the system controller 52 makes a request of the navigation control unit 2 to change the measurement position.

When receiving the request to change the measurement position from the system controller 52, the navigation control unit 2 moves the underwater moving object 1 to change the measurement position (step ST50).

After that, the processes of steps ST41 to ST50 are repeatedly carried out until the measurements are completed.

Although the example in which the system controller 52 selects the gain curve corresponding to the significant pixel number $C_1$ in the distance image from among the plurality of gain curves held by the gain information holder 51 and sets the gain curve to the time response gain adjuster 62 is shown in this Embodiment 3, a gain curve selected by the user or the system can be alternatively set to the time response gain adjuster 62.

As can be seen from the above description, because the laser radar device in accordance with this Embodiment 3 is configured in such a way that the system controller 52 selects a gain curve which makes the significant pixel number $C_1$ in the distance image be equal to or larger than the prescribed number $C_{ref1}$ from among the plurality of gain curves held by the gain information holder 51 and changes the setting of the gain curve to the time response gain adjuster 62, and also changes the setting of a parameter of the laser radar device 10 in such a way that the number $C_2$ of saturated pixels in the light intensity image is equal to or smaller than the permissible number $C_{ref2}$, the optical propagation loss due to the propagation space of the laser can be compensated for and a distance image and an intensity image at a greater distant can be acquired, in addition to the same advantages as those provided by any of above-mentioned Embodiments 1 and 2. Further, in order to improve the visibility of these images, a device parameter can be controlled autonomously.

Although the operation of imaging an underwater object is shown in this Embodiment 3, Embodiment 3 can be applied to an example of measuring an underwater topographical feature while the underwater moving object 1 navigates, like in the case of above-mentioned Embodiment 1.

Embodiment 4

Figure 22:
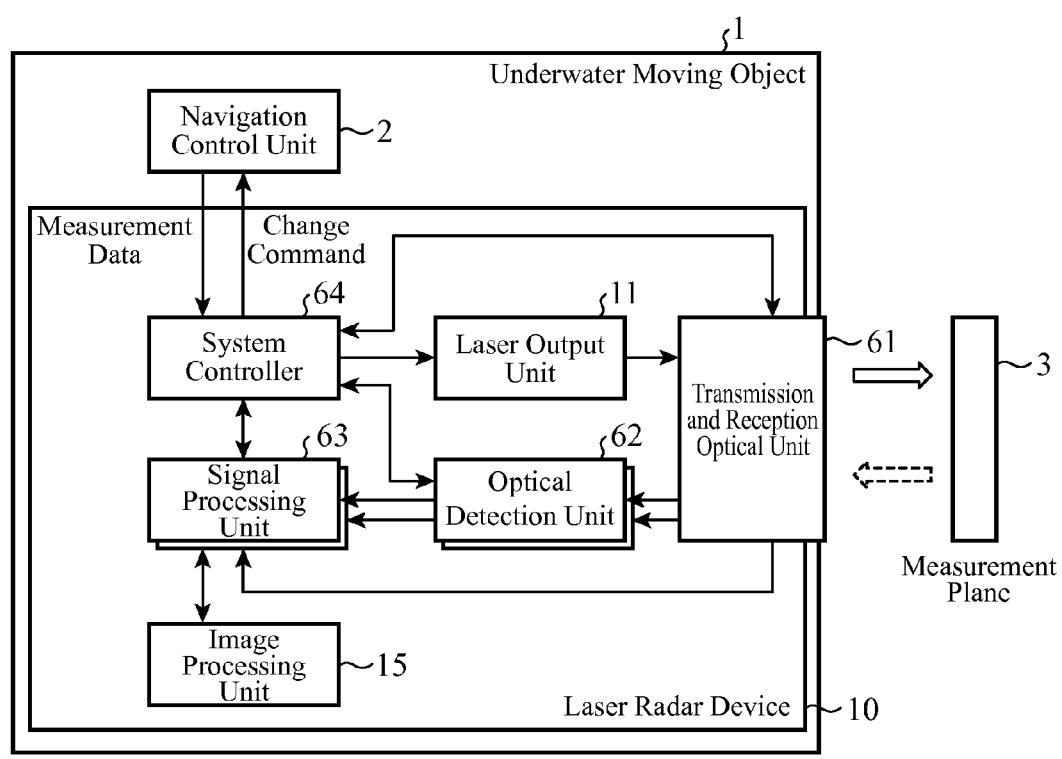
FIG. 22 is a block diagram showing a laser radar device in accordance with Embodiment 4 of the present invention.

FIG. 22 is a block diagram showing a laser radar device in accordance with Embodiment 4 of the present invention. In the figure, the same reference numerals as shown in FIGS. 1, 12, and 17 denote the same components or like components, and therefore the explanation of the components will be omitted hereafter.

A transmission and reception optical unit 61 performs a process of radiating pulse laser light (transmission light) outputted from a laser output unit 11 toward a measurement plane 3 while changing a beam scanning angle under control by a system controller 64, and receiving the pulse laser light (received light) which is reflected by the measurement plane 3 and then returns thereto.

The transmission and reception optical unit 61 is equipped with two sets of a transmission optical system 25 and a reception optical systems 26, unlike the transmission and reception optical unit 12 shown in FIG. 1 and other figures.

Although in this Embodiment 4 an example in which the transmission and reception optical unit is equipped with two sets of a transmission optical system 25 and a reception optical systems 26 will be explained, the transmission and reception optical unit can be alternatively equipped with three or more sets of a transmission optical system 25 and a reception optical systems 26.

An optical detection unit 62 is configured with optical detection units 13 (refer to FIG. 1 and other figures) whose number is the same as the number of sets of a transmission optical system 25 and a reception optical system 26 with which the transmission and reception optical unit 61 is equipped, and performs a process of converting pulse laser light focused by each reception optical system 26 into an electric signal and outputting the received signal which is the electric signal to a signal processing unit 143.

A laser light transmitter and receiver is configured with the laser output unit 11, the transmission and reception optical unit 61, and the optical detection unit 62.

The signal processing unit 63 is configured with signal processing units 14 (refer to FIG. 1 and other figures) whose number is the same as the number of sets of a transmission optical system 25 and a reception optical system 26 with which the transmission and reception optical unit 61 is equipped, and performs a process of measuring the elapsed time that elapses from the time when the pulse laser light is outputted from the laser output unit 11 to the time when each received signal is outputted from the optical detection unit 62, a process of calculating the distance from an underwater moving object 1 in which the device itself is mounted to the measurement plane 3 by using the elapsed time, a process of detecting the light intensity of the laser light received by each reception optical system 26, etc.

The system controller 64 consists of, for example, either a semiconductor integrated circuit equipped with a CPU, or a one chip microcomputer, and performs the same processes as those performed by the system controller 16 of FIG. 1, the system controller 40 of FIG. 12, or the system controller 52 of FIG. 17.

Further, because the transmission and reception optical unit 61 is equipped with the two sets of a transmission optical system 25 and a reception optical systems 26, the system controller 64 sets the receiving fields of view of the reception optical systems 26 in the sets in such a way that the receiving fields of view of the reception optical systems 26 in one of the sets differs from that of the reception optical system 26 in the other set.

The system controller 64 constructs a quality determinator, a relative relation changer, a low measurement point density area extractor, and a gain information selector.

Although it is assumed in the example shown in FIG. 22 that the laser output unit 11, the transmission and reception optical unit 61, the optical detection unit 62, the signal processing unit 63, an image processing unit 15, and the system controller 64, which are the components of the laser radar device, consist of pieces of hardware for exclusive use, respectively, all or a part of the laser radar device can alternatively consist of a computer.

For example, in a case in which a part of the laser radar device (e.g., the signal processing unit 63, the image processing unit 15, and the system controller 64) consists of a computer, a program in which the details of processing performed by the signal processing unit 63, the image processing unit 15, and the system controller 64 are described can be stored in a memory of the computer, and a CPU of the computer can be made to execute the program stored in the memory.

Figure 23:
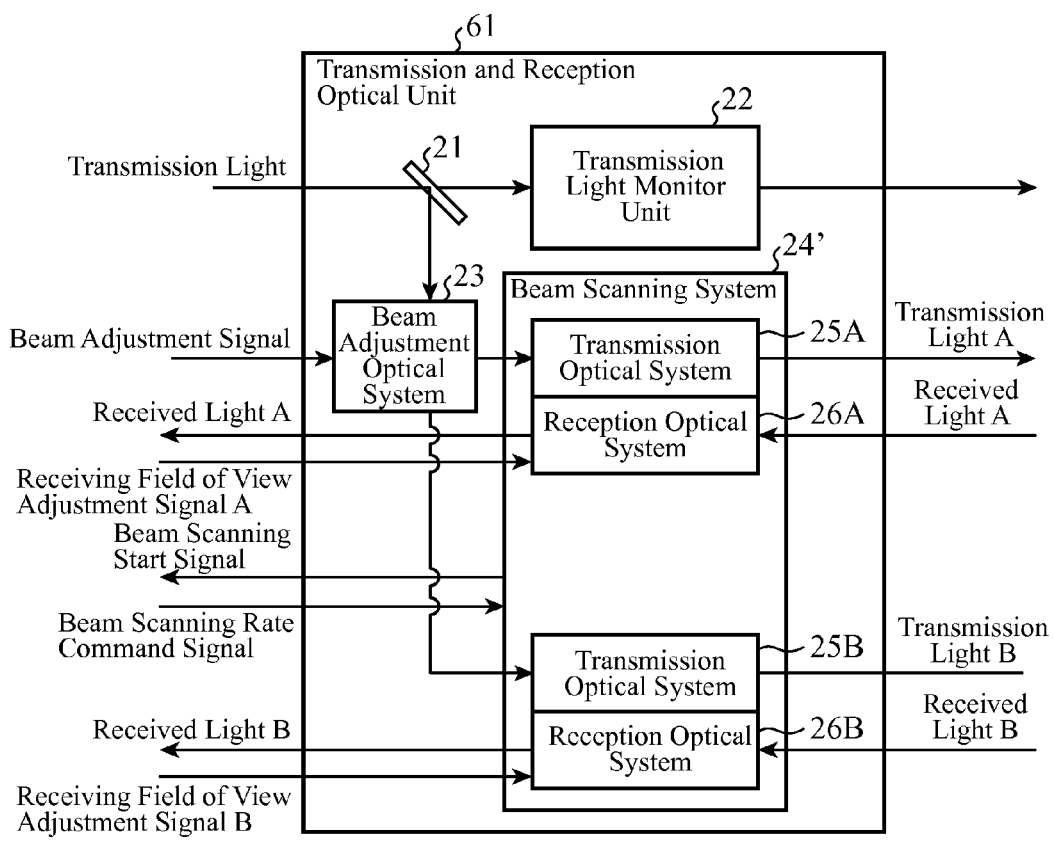
FIG. 23 is a block diagram showing a transmission and reception optical unit 61 of the laser radar device in accordance with Embodiment 4 of the present invention.

FIG. 23 is a block diagram showing the transmission and reception optical unit 61 of the laser radar device in accordance with Embodiment 4 of the present invention. In the figure, because the same reference numerals as those shown in FIG. 2 denote the same components or like components, the explanation of the components will be omitted hereafter.

A beam scanning system 24' is equipped with transmission optical systems 25A and 25B and reception optical systems 26A and 26B, and performs a process of changing the beam scanning angles of the pulse laser light beams radiated from the transmission optical systems 25A and 25B at a beam scanning rate (beam scanning period) shown by a beam scanning rate command signal outputted from the system controller 64, and also outputting a beam scanning start signal showing a start timing of the beam scanning to the signal processing unit 63.

The transmission optical system 25A is an optical system to radiate the pulse laser light (transmission light A) whose beam scanning angle is changed by the beam scanning system 24' and which is simultaneously adjusted by the beam adjustment optical system 23 toward the measurement plane 3.

The reception optical system 26A is an optical system whose optical axis is adjusted in the same direction as that of the transmission optical system 25A, to focus, onto the optical detection unit 62, the pulse laser light (received light A) which is reflected by the measurement plane 3 and then returns thereto after the receiving field of view is adjusted according to a receiving field of view adjustment signal A outputted from the system controller 64.

Transmission optical system 25B is an optical system whose optical axis is adjusted in a direction different from that of the transmission optical system 25A, to radiate the pulse laser light (transmission light B) whose beam scanning angle is changed by the beam scanning system 24' and which is simultaneously adjusted by the beam adjustment optical system 23 toward the measurement plane 3.

The reception optical system 26B is an optical system whose optical axis is adjusted in the same direction as that of the transmission optical system 25B, to focus, onto the optical detection unit 62, the pulse laser light (received light B) which is reflected by the measurement plane 3 and then returns thereto after the receiving field of view is adjusted according to a receiving field of view adjustment signal B outputted from the system controller 64.

Next, operations will be explained.

The laser radar device in accordance with this Embodiment 4 performs a plurality of line scannings to measure underwater topographical features while the underwater moving object 1 moves.

FIG. 24 is an explanatory drawing showing a state in which the laser radar device mounted in the underwater moving object 1 moving underwater measures a submarine surface.

The details of processing performed by the laser radar device in accordance with this Embodiment 4 are basically the same as, but differs from that performed by the laser radar device in accordance with any of above-mentioned Embodiments 1 to 3 in that the laser radar device in accordance with this Embodiment 4 performs a plurality of line scannings.

Hereafter, a portion which is different from that performed by the laser radar device in accordance with any of above-mentioned Embodiments 1 to 3 will be explained.

The optical axes of the transmission optical system 25A and the reception optical system 26A of the transmission and reception optical unit 61 are adjusted in advance in such away as to be aligned in the same direction.

Further, the optical axes of the transmission optical system 25B and the reception optical system 26B are adjusted in such a way as to be aligned in the same direction.

However, the optical axes of the transmission optical system 25A and the reception optical system 26A are aligned in a direction different from that of those of the transmission optical system 25B and the reception optical system 26B.

The system controller 64 initializes each of the processing units before starting measurements on the measurement plane 3, like that in accordance with any of above-mentioned Embodiments 1 to 3.

At that time, the system controller 64 outputs the receiving field of view adjustment signal A showing a receiving field of view to the reception optical system 26A of the transmission and reception optical unit 61, thereby initially setting a viewing angle in such a way that the receiving field of view of the reception optical system 26A becomes the same range as that of the pulse laser light (transmission light A) radiated from the transmission optical system 25A.

The system controller 64 also outputs the receiving field of view adjustment signal B showing a receiving field of view to the reception optical system 26B of the transmission and reception optical unit 61, thereby initially setting a viewing angle in such a way that the receiving field of view of the reception optical system 26B becomes the same range as that of the pulse laser light (transmission light B) radiated from the transmission optical system 25B.

The receiving field of view of the reception optical system 26A and the receiving field of view of the reception optical system 26B are adjusted in such a way that they do not overlap each other, thereby avoiding the occurrence of a cross talk.

When receiving the pulse laser light after adjustment from the beam adjustment optical system 23, the transmission optical system 25A radiates the pulse laser light (transmission light A) toward the measurement plane 3.

At that time, every time when receiving the pulse laser light after adjustment from the beam adjustment optical system 23, the beam scanning system 24' changes the beam scanning angle $\theta_{beam}$ of the pulse laser light radiated from the transmission optical system 25A in a scanning line A shown in FIG. 24.

When receiving the pulse laser light after adjustment from the beam adjustment optical system 23, the transmission optical system 25B radiates the pulse laser light (transmission light B) toward the measurement plane 3.

At that time, every time when receiving the pulse laser light after adjustment from the beam adjustment optical system 23, the beam scanning system 24' changes the beam scanning angle $\theta_{beam}$ of the pulse laser light radiated from the transmission optical system 25B in a scanning line B shown in FIG. 24.

When receiving the pulse laser light after adjustment from the beam adjustment optical system 23 for the first time, the beam scanning system 24' outputs a beam scanning start signal showing a start timing of the beam scanning to the signal processing unit 63.

In the reception optical system 26A, the receiving field of view is adjusted according to the receiving field of view adjustment signal A outputted from the system controller 64. The reception optical system focuses the pulse laser light (received light A) which is reflected by the measurement object and returns thereto after being radiated from the transmission optical system 25A onto the optical detection unit 62.

In the reception optical system 26B, the receiving field of view is adjusted according to the receiving field of view adjustment signal A outputted from the system controller 64. The reception optical system focuses the pulse laser light (received light B) which is reflected by the measurement object and returns thereto after being radiated from the transmission optical system 25B onto the optical detection unit 62.

The optical detection unit 62 converts the pulse laser light (received light A) focused by the reception optical system 26A into an electric signal with the light receiving gain which is initially set by the system controller 64, and outputs the received signal A which is the electric signal to the signal processing unit 63.

The optical detection unit 62 also converts the pulse laser light (received light B) focused by the reception optical system 26B into an electric signal with the light receiving gain which is initially set by the system controller 64, and outputs the received signal B which is the electric signal to the signal processing unit 63.

When receiving the received signals A and B from the optical detection unit 62, the signal processing unit 63 performs various signal processes on the received signals A and B, like the signal processing unit 14 shown in FIG. 1 and other figures.

Although this embodiment differs from above-mentioned Embodiments 1 to 3 in that the subsequent processes are performed on each of the received signals, the explanation of the processes will be omitted hereafter because the details of the processes are the same as those in accordance any of above-mentioned Embodiments 1 to 3.

In accordance with this Embodiment 4, there can be provided an advantage of being able to increase measurement opportunities during one navigation by measuring an underwater topographical feature multiple times by performing a plurality of line scannings, thereby being able to reduce the necessity to perform re-measurements. Further, the search area of the underwater moving object 1 can be enlarged.

Although the case of performing two line scannings is explained in this Embodiment 4, this number of lines can be two or larger.

Further, although the number of laser light sources of the laser output unit 11 is one in the configuration shown in FIG. 22, a plurality of laser light sources can be alternatively prepared, and pulse laser light beams can be outputted while the plurality of light sources are brought into correspondence with the transmission optical systems 25 in the transmission and reception optical unit 61, respectively.

In addition, the plurality of laser light sources can be configured in such away as to oscillate laser light beams having different wavelengths, and pulse laser light beams can be outputted while the plurality of light sources are brought into correspondence with the transmission optical systems 25 in the transmission and reception optical unit 61, respectively.

As a result, for example, by mounting, to each of the reception optical systems 26, a wavelength filter matching the wavelength characteristics of the corresponding laser light source, cross talks of scattered light due to other line scanning can be further reduced.

Although the example in which the laser radar device 10 is mounted in the underwater moving object 1 is shown in above-mentioned Embodiments 1 to 4, the present invention is not limited to this example in which the laser radar device is mounted in the underwater moving object 1. For example, the laser radar device 10 can be mounted in an aerial moving object or a land moving object.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

Because the laser radar device in accordance with the present invention includes the quality determinator to determine whether the quality of an image generated by the imager satisfies the reference quality, and the relative relation changer to change the physical relative relation between the measurement object and the device in question when the quality determinator determines that the quality of the image does not satisfy the reference quality, and can ensure desired image quality, the laser radar device in accordance with the present invention is suitable for being mounted in a ship, an underwater moving object, or the like, and measuring the shape of an object underwater.

EXPLANATIONS OF REFERENCE NUMERALS

1 underwater moving object, 2 navigation control unit, 3 measurement plane (measurement object), 10 laser radar device, 11 laser output unit (laser light transmitter and receiver), transmission and reception optical unit (laser light transmitter and receiver), 13 optical detection unit (laser light transmitter and receiver), 14 signal processing unit, 15 image processing unit (imager, three-dimensional map generator), 16 system controller (quality determinator, relative relation changer, low measure point density area extractor), 21 laser light brancher, 22 transmission light monitor unit, 23 beam adjustment optical system, 24 and 24' beam scanning system, 25, 25A, and 25B transmission optical system, 26, 26A, and 26B reception optical system, 26 and 31 threshold adjusting unit (received signal selector), 32 elapsed time measuring unit (elapsed time measurer), 33 light intensity detecting unit (light intensity detector), 34 distance and three dimensional coordinate calculator (distance calculator, three dimensional coordinate calculator), 35 data storage unit, 40 system controller (quality determinator, relative relation changer, low measure point density area extractor), 51 gain information holder (gain information holder), 52 system controller (quality determinator, relative relation changer, low measure point density area extractor, gain information selector), 61 transmission and reception optical unit (laser light transmitter and receiver), 62 optical detection unit (laser light transmitter and receiver), 63 signal processing unit, and 64 system controller (quality determinator, relative relation changer, low measure point density area extractor).

The invention claimed is:
1. A laser radar device comprising:
a laser light transmitter and receiver to radiate laser light toward a measurement object while changing a beam scanning angle, and receive said laser light which is reflected by said measurement object and then returns thereto;

an elapsed time measurer to measure an elapsed time that elapses from a time when the laser light is radiated from said laser light transmitter and receiver to a time when the laser light is received by said laser light transmitter and receiver;

a distance calculator to calculate a distance from said device in question to said measurement object by using the elapsed time measured by said elapsed time measurer;

an imager to image the distance calculated by said distance calculator;

a quality determinator to determine whether image quality showing either a number of pixels each having a measured distance value or a degree of omission in measurement portions, in of an image generated by said imager, satisfies reference quality; and a relative relation changer to change at least one of a speed and an altitude of said device in question with respect to said measurement object when said quality determinator determines that the image quality does not satisfy the reference quality, wherein said quality determinator determines whether an omission in measurement portions occurs in the image generated by said imager from a relation among a speed of a moving object in which said device in question is mounted, an altitude of said moving object, a beam divergence, and a beam scanning rate, and, when an omission in measurement portions occurs, determines that said image quality does not satisfy the reference quality.

2. The laser radar device according to claim 1, wherein said laser radar device includes a light intensity detector to detect light intensity of the laser light received by said laser light transmitter and receiver, and said imager images the light intensity detected by said light intensity detector.

3. The laser radar device according to claim 1, wherein said laser radar device includes a three dimensional coordinate calculator to calculate three dimensional coordinates of a measure point in the measurement object from both the distance calculated by said distance calculator and the beam scanning angle of the laser light by said laser light transmitter and receiver, and said imager images the three dimensional coordinates calculated by said three dimensional coordinate calculator.

4. The laser radar device according to claim 1, wherein when said quality determinator determines that the image quality does not satisfy the reference quality, said relative relation changer changes the speed of said device in question with respect to the measurement object by commanding the moving object to lower the speed.

5. The laser radar device according to claim 4, wherein when the speed of the moving object cannot be lowered, said relative relation changer changes the altitude of said device in question with respect to the measurement object by commanding the moving object to change the altitude.

6. The laser radar device according to claim 5, wherein when an amount of variation in a spatial resolution exceeds a preset permissible amount due to a change of the altitude of the moving object, said relative relation changer changes a specification of the laser light radiated from said laser light transmitter and receiver within limits at which the amount of variation in said spatial resolution does not exceed said permissible amount, without commanding said moving object to change the altitude.

7. The laser radar device according to claim 3, wherein said laser radar device includes a three-dimensional map generator to generate a three-dimensional map from the three dimensional coordinates calculated by said three dimensional coordinate calculator, and a low measurement point density area extractor to examine a measurement point gap of the three-dimensional map generated by said three-dimensional map generator, and extract an area where a measurement point density is lower than a reference density and notify said area to the moving object.

8. The laser radar device according to claim 1, wherein the quality determinator counts a number of pixels which are included in pixels which construct the image generated by said imager and each of which has a measured distance value which has succeeded in being measured, and, when said number is smaller than a reference number, determines that said image quality does not satisfy the reference quality.

9. The laser radar device according to claim 8, wherein when said quality determinator determines that the image quality does not satisfy the reference quality, said relative relation changer changes at least one of the speed and the altitude of said device in question with respect to said measurement object by commanding the moving object to move closer to the measurement object.

10. The laser radar device according to claim 2, wherein said quality determinator counts a number of pixels which are included in pixels which construct the image generated by said imager and each of which has a measured distance value which has succeeded in being measured and also counts a number of pixels which are included in pixels which construct the light intensity image generated by said imager and each of which has a saturation value, and, even if the number of pixels each having the measured distance value which has succeeded in being measured is equal to or larger than a first reference number but the number of pixel each having the saturation value is equal to or larger than a second reference number, determines that the quality of the image does not satisfy the reference quality.

11. The laser radar device according to claim 10, wherein said relative relation changer changes a transmission and reception condition for laser light when said quality determinator determines that the image quality does not satisfy the reference quality.

12. The laser radar device according to claim 2, wherein said laser light transmitter and receiver is equipped with a light receiver to, when receiving the laser light which is reflected by the measurement object and then returns thereto, convert said laser light into an electric signal and output a received signal which is said electric signal, and said laser radar device includes a received signal selector to, only when a signal level of the received signal outputted from said light receiver is equal to or higher than a reference level, output said received signal to said elapsed time measurer and said light intensity detector, and wherein said elapsed time measurer measures the elapsed time that elapses from the time when the laser light is radiated from said laser light transmitter and receiver to the time when the received signal is outputted from said received signal selector and said light intensity detector detects a peak value of the received signal outputted from said received signal selector as the light intensity of the laser light received by said laser light transmitter and receiver.

13. The laser radar device according to claim 12, wherein said light receiver applies a gain varying according to the elapsed time that elapses from a time when said laser light transmitter and receiver starts radiating the laser light to the received signal, and outputs the received signal to which the gain is applied to said received signal selector.

14. The laser radar device according to claim 1, wherein said laser light transmitter and receiver performs one-dimensional scanning of the laser light for the measurement object when receiving a command to perform one-dimensional beam scanning from outside the laser light transmitter and receiver, and performs two-dimensional scanning of the laser light for the measurement object when receiving a command to perform two-dimensional beam scanning from outside the laser light transmitter and receiver.

15. A radar image generating method comprising:
a laser light transmission and reception processing step of a laser light transmitter and receiver radiating laser light toward a measurement object while changing a beam scanning angle, and receiving said laser light which is reflected by said measurement object and then returns thereto;
an elapsed time measurement processing step of an elapsed time measurer measuring an elapsed time that elapses from a time when the laser light is radiated in said laser light transmission and reception processing step to a time when the laser light is received in said laser light transmission and reception processing step;
a distance calculation processing step of a distance calculator calculating a distance from said device in question to said measurement object by using the elapsed time measured in said elapsed time measurement processing step;
an imaging step of an imager imaging the distance calculated in said distance calculation processing step;
a quality determination processing step of a quality determinator determining whether image quality showing either a number of pixels each having a measured distance value or a degree of omission in measurement portions, in an image generated in said imaging processing step satisfies reference quality; and
a relative relation change processing step of a relative relation changer changing at least one of a speed and an altitude of said device in question with respect to said measurement object when it is determined in said quality determination processing step that the image quality does not satisfy the reference quality,
wherein said quality determinator determines whether an omission in measurement portions occurs in the image generated by said imager from a relation among a speed of a moving object in which said device in question is mounted, an altitude of said moving object, a beam divergence, and a beam scanning rate, and, when an omission in measurement portions occurs, determines that said image quality does not satisfy the reference quality.

* * * * *